US012737814B2

(12) United States Patent
Willis et al.

(10) Patent No.: US 12,737,814 B2
(45) Date of Patent: Sep. 15, 2026

(54) SYSTEMS AND METHODS FOR AUTOMATICALLY CLASSIFYING DISTRIBUTED USER-STATE DATA ACROSS A PLURALITY OF HETEROGENEOUS DATA SOURCES

(71) Applicant: PocketNest, Inc., Royal Oak, MI (US)

(72) Inventors: Jessica Willis, Huntington Woods, MI (US); Chris Wascha, Detroit, MI (US); Erik Gratz, Souix Falls, SD (US); Joel Powell, Detroit, MI (US); Tucker Steelman, Tamala, CA (US)

(73) Assignee: PocketNest, Inc., Royal Oak, MI (US)

( * ) Notice: Subject to any disclaimer, the term of this patent is extended or adjusted under 35 U.S.C. 154(b) by 0 days.

(21) Appl. No.: 19/534,069

(22) Filed: Feb. 9, 2026

(65) Prior Publication Data

US 2026/0203820 A1 Jul. 16, 2026

Related U.S. Application Data

(63) Continuation-in-part of application No. 18/796,675, filed on Aug. 7, 2024, which is a continuation of application No. 16/864,599, filed on May 1, 2020, now abandoned.

(60) Provisional application No. 62/842,256, filed on May 2, 2019.

(51) Int. Cl.

| | |
|---|---|
| ***G06Q 40/06*** | (2012.01) |
| ***G06Q 10/0631*** | (2023.01) |
| ***G06Q 40/02*** | (2023.01) |

(52) U.S. Cl.
CPC ....... *G06Q 40/06* (2013.01); *G06Q 10/06311* (2013.01); *G06Q 40/02* (2013.01)

(58) Field of Classification Search
CPC ... G06Q 40/06; G06Q 10/06311; G06Q 40/02
USPC ........................................................ 705/3–44
See application file for complete search history.

(56) References Cited

U.S. PATENT DOCUMENTS

| | | | | |
|---|---|---|---|---|
| 8,200,573 | B2 * | 6/2012 | Fineout | G06Q 10/087 705/28 |
| 8,548,903 | B2 * | 10/2013 | Becker | G06Q 40/03 705/38 |
| 10,664,247 | B1 * | 5/2020 | Hubbard | G06F 8/35 |

(Continued)

OTHER PUBLICATIONS

Vitor Valerio de Souza Campos et al., "Review and comparison of works on heterogeneous data and semantic analysis in Big Data", Semina: Ciênc. Ex. Tech., Londrina, v. 42, n. 1, p. 113-128, Jan./Jun. (Year: 2021).*

(Continued)

*Primary Examiner* — Frantzy Poinvil
(74) *Attorney, Agent, or Firm* — Padowithz Alce; Quintin Scheitlin; Alce PLLC

(57) ABSTRACT

A system and method for automatically classifying distributed user state data across a plurality of heterogeneous data sources may include receiving encrypted user state data, generating a normalized user-state data structure based on the encrypted user state data, generating a completion-state classification vector based on the normalized user-state data structure, and automatically propagating the normalized user-state data and/or completion-state data to one or more third-party computing services.

16 Claims, 3 Drawing Sheets

(56) References Cited

U.S. PATENT DOCUMENTS

| | | | | |
|---|---|---|---|---|
| 11,681,811 | B1 * | 6/2023 | Dixit | G06F 8/65<br>726/25 |
| 11,853,982 | B1 * | 12/2023 | Woodward | G06Q 40/03 |
| 2008/0228640 | A1 * | 9/2008 | Brown | G06Q 20/10<br>705/39 |
| 2009/0106141 | A1 * | 4/2009 | Becker | G06Q 40/08<br>705/38 |
| 2010/0332355 | A1 * | 12/2010 | Lopez | G06Q 30/02<br>703/1 |
| 2018/0075535 | A1 * | 3/2018 | Alvarenga | G06Q 40/06 |
| 2023/0130840 | A1 * | 4/2023 | Olesen | G06Q 40/00<br>705/38 |
| 2025/0335998 | A1 * | 10/2025 | Hurwitz | G06Q 40/06 |
| 2026/0134474 | A1 * | 5/2026 | Patton | G06Q 40/04 |

OTHER PUBLICATIONS

Putrama et al., Heterogeneous data integration: Challenges and Opportunities, a Department of Electronics Technology, Faculty of Electrical Engineering and Informatics, Budapest University of Technology and Economics, Budapest, Hungary, Published by Elsevier Inc. (Year: 2024).*

* cited by examiner

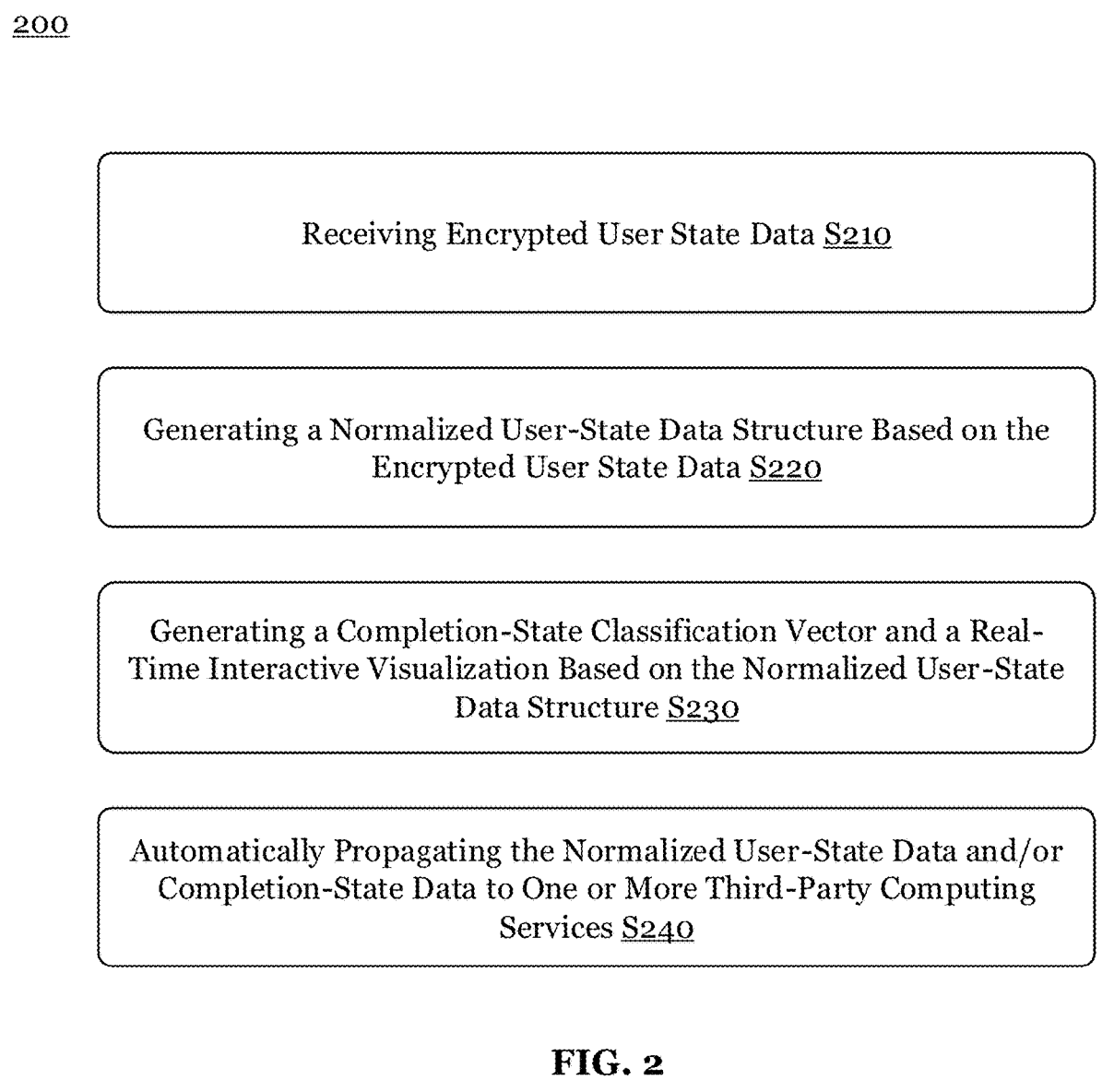

200

Receiving Encrypted User State Data S210

Generating a Normalized User-State Data Structure Based on the Encrypted User State Data S220

Generating a Completion-State Classification Vector and a Real-Time Interactive Visualization Based on the Normalized User-State Data Structure S230

Automatically Propagating the Normalized User-State Data and/or Completion-State Data to One or More Third-Party Computing Services S240

FIG. 2

SYSTEMS AND METHODS FOR AUTOMATICALLY CLASSIFYING DISTRIBUTED USER-STATE DATA ACROSS A PLURALITY OF HETEROGENEOUS DATA SOURCES

CROSS-REFERENCE TO RELATED APPLICATIONS

This application is a continuation-in-part of U.S. patent application Ser. No. 18/796,675, filed 7 Aug. 2024, which is a continuation of U.S. patent application Ser. No. 16/864,599, filed on 1 May 2020, which claims the benefit of U.S. Provisional Application No. 62/842,256, filed on 2 May 2019; each of which is incorporated herein by reference in its entirety for all purposes.

TECHNICAL FIELD

This invention relates generally to the distributed data classification field and more specifically, to a new and useful system and method for automatically classifying distributed user-state data across a plurality of heterogeneous data sources.

BACKGROUND

User-related data is generated across many different applications, services, and user interfaces as users interact with modern computing systems. Such user-related data is often stored using disparate data schemas, making it difficult to determine, in a computationally efficient manner, whether a user has satisfied machine-evaluated state conditions across systems.

Accordingly, there is a need for new and improved systems and methods for automatically classifying distributed user data. The embodiments of the present application provide technical solutions that at least address the needs described above, as well as the deficiencies of the state of the art.

BRIEF SUMMARY OF THE INVENTION(S)

In some embodiments, a computer-implemented system for classifying distributed user state data across a plurality of heterogeneous data sources comprises: a memory storing a plurality of computer-executable instructions and maintaining: a normalized user-state data structure that comprises normalized, machine-readable user state data converted from a plurality of heterogeneous data sources; a completion-state propagation index that associates one or more completion-state classification vectors with one or more service identifiers of one or more third-party computing services; and one or more processors that execute the plurality of computer-executable instructions to perform operations comprising: receiving, from the plurality of heterogeneous data sources, encrypted user state data collected through a sequence of event-driven user interfaces, wherein the encrypted user state data includes encrypted user-entered responses and encrypted account data obtained from one or more linked external accounts; decrypting, by the one or more processors executing a computer decryption program, the encrypted user state data into decrypted user state data and transforming the decrypted user state data into the normalized user-state data structure by: extracting, by a feature extractors, a corpus of raw user state features from the decrypted user state data, converting, by the one or more processors, the corpus of raw user state features into normalized user state features associated with the normalized user-state data structure, and embedding the normalized user state features into the normalized user-state data structure; generating, based on the normalized user-state data structure, a completion-state classification vector of the one or more completion-state classification vectors comprising a completion state classification value for a plurality of state-dependent tasks; in response to generating the completion-state classification vector: generating, by the one or more processors, one or more positive state-completion signals indicating that the completion state classification value for a subset of the plurality of state-dependent tasks satisfy predefined state-completion criteria; generating, by the one or more processors, one or more negative state-completion signals indicating that the completion state classification value for a remainder of the plurality of state-dependent tasks do not satisfy the predefined state-completion criteria; and generating a real-time interactive visualization of the completion-state classification vector and the one or more positive and negative state-completion signals; requesting, from an authorized user associated with the encrypted user state data, permission to display the real-time interactive visualization of the completion-state classification vector and the one or more positive and negative state-completion signals; transmitting, via the one or more processors, the real-time interactive visualization to a device of the authorized user after the permission is granted; and automatically providing, via the one or more processors, the one or more third-party computing services with access to (i) the completion-state classification vector generated for the authorized user and (ii) the real-time interactive visualization of the completion-state classification vector, and (iii) the normalized user-state data structure in response to the authorized user subscribing to each of the third-party computing services, wherein the completion-state propagation index is updated to store a machine-readable association between the completion-state classification vector of the authorized user and each of the third-party computing services.

In some embodiments, generating the competition state classification value for a first respective state-dependent task of the plurality of state-dependent tasks includes: extracting, from the normalized user-state data structure, a first plurality of user state columns mapped to the first respective state-dependent task; in response to extracting the first plurality of user state columns mapped to the first respective state-dependent task, generating a first binary state-bit value encoding that each of the first plurality of user state columns comprises a non-null value; embedding, into the completion-state classification vector, the first binary state-bit value at a first index position of the completion-state classification vector corresponding to the first respective state-dependent task.

In some embodiments, generating the competition state classification value for a second respective state-dependent task of the plurality of state-dependent tasks includes: extracting, from the normalized user-state data structure, a second plurality of user state columns mapped to the second respective state-dependent task, different from the first plurality of user state columns; in response to extracting the second plurality of user state columns mapped to the second respective state-dependent task, generating a second binary state-bit value encoding that at least one the second plurality of user state columns comprises a null value; and embedding, into the completion-state classification vector, the second binary state-bit value at a second index position of the completion-state classification vector corresponding to the second respective state-dependent task.

In some embodiments, generating the one or more positive and negative state-completion signals and the real-time interactive visualization includes: detecting, by the one or more processors, that a first index position of the completion-state classification vector includes a first binary state-bit value encoded to indicate that at least one of a first plurality of user state columns in the normalized user-state data structure comprise a null value; in response to detecting the first index position of the completion-state classification vector, broadcasting, to a primary user interface controller node, a first real-time broadcast message comprising a first key-value payload comprising: a first key-value pair comprising a state-dependent task key and a first respective state-dependent task corresponding to the first index position as a value of the state-dependent task key, and a second key-value pair comprising a completion state classification value key and the first binary state-bit value as a value of the completion state classification value key; creating, in the real-time interactive visualization, a first visual task element based on the value of the completion state classification value key in the first real-time broadcast message; and setting, by the primary user interface controller node, the first visual task element to a first chromatic intensity based on the value of the state-dependent task key in the first real-time broadcast message.

In some embodiments, the one or more processors that execute the plurality of computer-executable instructions perform the operations comprising: generating, via the sequence of event-driven user interfaces, updated encrypted user state data for the first respective state-dependent task; in response to generating the updated encrypted user state data for the first respective state-dependent task: detecting, by the one or more processors, that the first index position of the completion-state classification vector has been updated from the first binary state-bit value to a second binary state-bit value encoded to indicate that each of the first plurality of user state columns in the normalized user-state data structure comprises a non-null value; broadcasting, in response to detecting that the first index position has been updated to the second binary state-bit value, an update to the first real-time broadcast message that changes the value of the completion state classification value key from the first binary state-bit value to the second binary state-bit value; and dynamically changing, by the primary user interface controller node in real-time, the first visual task element from the first chromatic intensity to a second chromatic intensity in response to broadcasting the update to the first real-time broadcast message.

In some embodiments, generating the one or more positive and negative state-completion signals and the real-time interactive visualization includes: detecting, by the one or more processors, that a second index position of the completion-state classification vector includes a second binary state-bit value encoded to indicate that each of a second plurality of user state columns in the normalized user-state data structure comprise a non-null value; in response to detecting the second index position of the completion-state classification vector, broadcasting, to the primary user interface controller node, a second real-time broadcast message comprising a second key-value payload comprising: a third key-value pair comprising the state-dependent task key and a second respective state-dependent task corresponding to the second index position as the value of the state-dependent task key, and a fourth key-value pair comprising the completion state classification value key and the second binary state-bit value as the value of the completion state classification value key; creating, in the real-time interactive visualization, a second visual task element based on the value of the completion state classification value key in the second real-time broadcast message; and setting, by the primary user interface controller node, the second visual task element to a second chromatic intensity based on the value of the state-dependent task key in the second real-time broadcast message.

In some embodiments, requesting the permission to display the real-time interactive visualization and transmitting the real-time interactive visualization to the device of the authorized user includes: transmitting, via the one or more processors, an electronic communication to the authorized user comprising: a first graphical user interface button that grants the permission to display the real-time interactive visualization on the device of the authorized user, and a second graphical user interface button that denies the permission to display the real-time interactive visualization on the device of the authorized user; automatically installing, on the device of the authorized user, an application bundle in response to receiving a selection of the first graphical user interface button; and automatically launching the application bundle and navigating to the real-time interactive visualization after automatically installing the application bundle on the device of the authorized user.

In some embodiments, the one or more processors that execute the plurality of computer-executable instructions perform the operations comprising: after automatically providing the one or more third-party computing services with access to (i) the completion-state classification vector generated for the authorized user, (ii) the real-time interactive visualization of the completion-state classification vector, and (iii) the normalized user-state data structure in response to the authorized user subscribing to each of the third-party computing services: detecting, by the application bundle, that a third-party application associated with the one or more third-party computing services is open at the device of the authorized user; and establishing a bi-directional communication channel between the third-party application and the one or more processors in response to detecting that the third-party application is open; automatically transmitting, via the bi-directional communication channel, the one or more positive state-completion signals to the third-party application; and in response to the third-party application receiving the one or more positive state-completion signals, automatically inhibiting execution of an activated function of the third-party application corresponding to the subset of the plurality of state-dependent tasks that satisfy the predefined state-completion criteria.

In some embodiments, the one or more processors that execute the plurality of computer-executable instructions perform the operations comprising: after automatically providing the one or more third-party computing services with access to (i) the completion-state classification vector generated for the authorized user, (ii) the real-time interactive visualization of the completion-state classification vector, and (iii) the normalized user-state data structure in response to the authorized user subscribing to each of the third-party computing services: automatically transmitting, via the bi-directional communication channel, the one or more negative state-completion signals to the third-party application; and automatically surfacing, via a popup window of the third-party application, one or more unused or unavailable functions of the third-party application associated with each of the remainder of the plurality of state-dependent tasks that do not satisfy the predefined state-completion criteria.

In some embodiments, the one or more processors that execute the plurality of computer-executable instructions perform the operations comprising: after automatically providing the one or more third-party computing services with access to (i) the completion-state classification vector generated for the authorized user, (ii) the real-time interactive visualization of the completion-state classification vector, and (iii) the normalized user-state data structure in response to the authorized user subscribing to each of the third-party computing services: detecting, by the application bundle, that a third-party application associated with the one or more third-party computing services is open at the device of the authorized user; and establishing, via the one or more processors, a bi-directional communication channel between the third-party application and the one or more processors in response to detecting that the third-party application is open; automatically transmitting, via the bi-directional communication channel, the one or more positive state-completion signals to the third-party application; and in response to the third-party application receiving the one or more positive state-completion signals, automatically providing, via the third-party application, a third-party system-generated credential that was not previously available to the authorized user before the one or more positive state-completion signals were transmitted.

In some embodiments, converting the corpus of raw user state features into the normalized user state features includes: extracting, via the one or more processors, the normalized user state features associated with the normalized user-state data structure; constructing, via the one or more processors, a machine-readable classification prompt that specifies a normalization schema for mapping the corpus of raw user state features to the normalized user state features; inputting, via the one or more processors, the machine-readable classification prompt to a large language model; and receiving, in response to the large language model executing the machine-readable classification prompt, a machine-readable output that maps each raw user state feature in the corpus of raw user state features to a respective normalized user state feature of the normalized user state features.

In some embodiments, the normalization schema for mapping the corpus of raw user state features to the normalized user state features comprises: a plurality of raw input feature identifiers corresponding to the corpus of raw user state features; a plurality of normalized feature identifiers corresponding to the normalized user state features; a required output structure defining a set of parameterized schema elements, each parameterized schema element of the set of parameterized schema elements comprising: a respective normalized feature identifier corresponding to a distinct one of the plurality of normalized feature identifiers; and a placeholder parameter that prompts the large language model to replace text associated with the placeholder parameter with a raw input feature identifier corresponding to the respective normalized feature identifier.

In some embodiments, the one or more processors that execute the plurality of computer-executable instructions perform the operations comprising: detecting, by the one or more processors, that the text of the placeholder parameter has not been replaced with the raw input feature identifier; and inserting, in place of the placeholder parameter, a null identifier corresponding to the respective normalized feature identifier.

In some embodiments, in response to the authorized user unsubscribing from a respective third-party computing service: the one or more processors remove, from the completion-state propagation index, the machine-readable association between the completion-state classification vector of the authorized user and each of the third-party computing services, thereby preventing subsequent access by the respective third-party computing service.

In some embodiments, the one or more processors that execute the plurality of computer-executable instructions perform the operations comprising: detecting, in real-time, a change in a completion state classification value at a corresponding index position of a respective completion-state classification vector of the one or more completion-state classification vectors stored in the completion-state propagation index; and propagating the change to each third-party computing service associated with the completion-state classification vector by transmitting only an index position identifier and an updated binary state-bit value, without regenerating the completion-state classification vector or reprocessing the normalized user-state data structure.

In some embodiments, a computer-implemented method for classifying distributed user state data across a plurality of heterogeneous data sources comprises: receiving, from the plurality of heterogeneous data sources, encrypted user state data collected through a sequence of event-driven user interfaces, wherein the encrypted user state data includes encrypted user-entered responses and encrypted account data obtained from one or more linked external accounts; decrypting, by the one or more processors executing a computer decryption program, the encrypted user state data into decrypted user state data and transforming the decrypted user state data into the normalized user-state data structure by: extracting, by a feature extractors, a corpus of raw user state features from the decrypted user state data, converting, by the one or more processors, the corpus of raw user state features into normalized user state features associated with the normalized user-state data structure, and embedding the normalized user state features into the normalized user-state data structure; generating, based on the normalized user-state data structure, a completion-state classification vector of the one or more completion-state classification vectors comprising a completion state classification value for a plurality of state-dependent tasks; in response to generating the completion-state classification vector: generating, by the one or more processors, one or more positive state-completion signals indicating that the completion state classification value for a subset of the plurality of state-dependent tasks satisfy predefined state-completion criteria; generating, by the one or more processors, one or more negative state-completion signals indicating that the completion state classification value for a remainder of the plurality of state-dependent tasks do not satisfy the predefined state-completion criteria; and generating a real-time interactive visualization of the completion-state classification vector and the one or more positive and negative state-completion signals; requesting, from an authorized user associated with the encrypted user state data, permission to display the real-time interactive visualization of the completion-state classification vector and the one or more positive and negative state-completion signals; transmitting, via the one or more processors, the real-time interactive visualization to a device of the authorized user after the permission is granted; and automatically providing, via the one or more processors, the one or more third-party computing services with access to (i) the completion-state classification vector generated for the authorized user and (ii) the real-time interactive visualization of the completion-state classification vector, and (iii) the normalized user-state data structure in response to the authorized user subscribing to each of the third-party computing services, wherein the completion-state propagation index is updated to store a machine-readable association between the completion-state classification vector of the authorized user and each of the third-party computing services.

In some embodiments, generating the competition state classification value for a first respective state-dependent task of the plurality of state-dependent tasks includes: extracting, from the normalized user-state data structure, a first plurality of user state columns mapped to the first respective state-dependent task; in response to extracting the first plurality of user state columns mapped to the first respective state-dependent task, generating a first binary state-bit value encoding that each of the first plurality of user state columns comprises a non-null value; and embedding, into the completion-state classification vector, the first binary state-bit value at a first index position of the completion-state classification vector corresponding to the first respective state-dependent task.

In some embodiments, generating the competition state classification value for a second respective state-dependent task of the plurality of state-dependent tasks includes: extracting, from the normalized user-state data structure, a second plurality of user state columns mapped to the second respective state-dependent task, different from the first plurality of user state columns; in response to extracting the second plurality of user state columns mapped to the second respective state-dependent task, generating a second binary state-bit value encoding that at least one the second plurality of user state columns comprises a null value; and embedding, into the completion-state classification vector, the second binary state-bit value at a second index position of the completion-state classification vector corresponding to the second respective state-dependent task.

In some embodiments, generating the one or more positive and negative state-completion signals and the real-time interactive visualization includes: detecting, by the one or more processors, that a first index position of the completion-state classification vector includes a first binary state-bit value encoded to indicate that at least one of a first plurality of user state columns in the normalized user-state data structure comprise a null value; in response to detecting the first index position of the completion-state classification vector, broadcasting, to a primary user interface controller node, a first real-time broadcast message comprising a first key-value payload comprising: a first key-value pair comprising a state-dependent task key and a first respective state-dependent task corresponding to the first index position as a value of the state-dependent task key, and a second key-value pair comprising a completion state classification value key and the first binary state-bit value as a value of the completion state classification value key; creating, in the real-time interactive visualization, a first visual task element based on the value of the completion state classification value key in the first real-time broadcast message; and setting, by the primary user interface controller node, the first visual task element to a first chromatic intensity based on the value of the state-dependent task key in the first real-time broadcast message.

In some embodiments, the computer-implemented method further comprises: generating, via the sequence of event-driven user interfaces, updated encrypted user state data for the first respective state-dependent task; in response to generating the updated encrypted user state data for the first respective state-dependent task: detecting, by the one or more processors, that the first index position of the completion-state classification vector has been updated from the first binary state-bit value to a second binary state-bit value encoded to indicate that each of the first plurality of user state columns in the normalized user-state data structure comprises a non-null value; broadcasting, in response to detecting that the first index position has been updated to the second binary state-bit value, an update to the first real-time broadcast message that changes the value of the completion state classification value key from the first binary state-bit value to the second binary state-bit value; and dynamically changing, by the primary user interface controller node in real-time, the first visual task element from the first chromatic intensity to a second chromatic intensity in response to broadcasting the update to the first real-time broadcast message.

BRIEF DESCRIPTION OF THE FIGURES

FIG. 2 illustrates an example method 200 in accordance with one or more embodiments of the present application.

DESCRIPTION OF THE PREFERRED EMBODIMENTS

The following description of the preferred embodiments of the inventions are not intended to limit the inventions to these preferred embodiments, but rather to enable any person skilled in the art to make and use these inventions.

1.00 System

Figure 1:
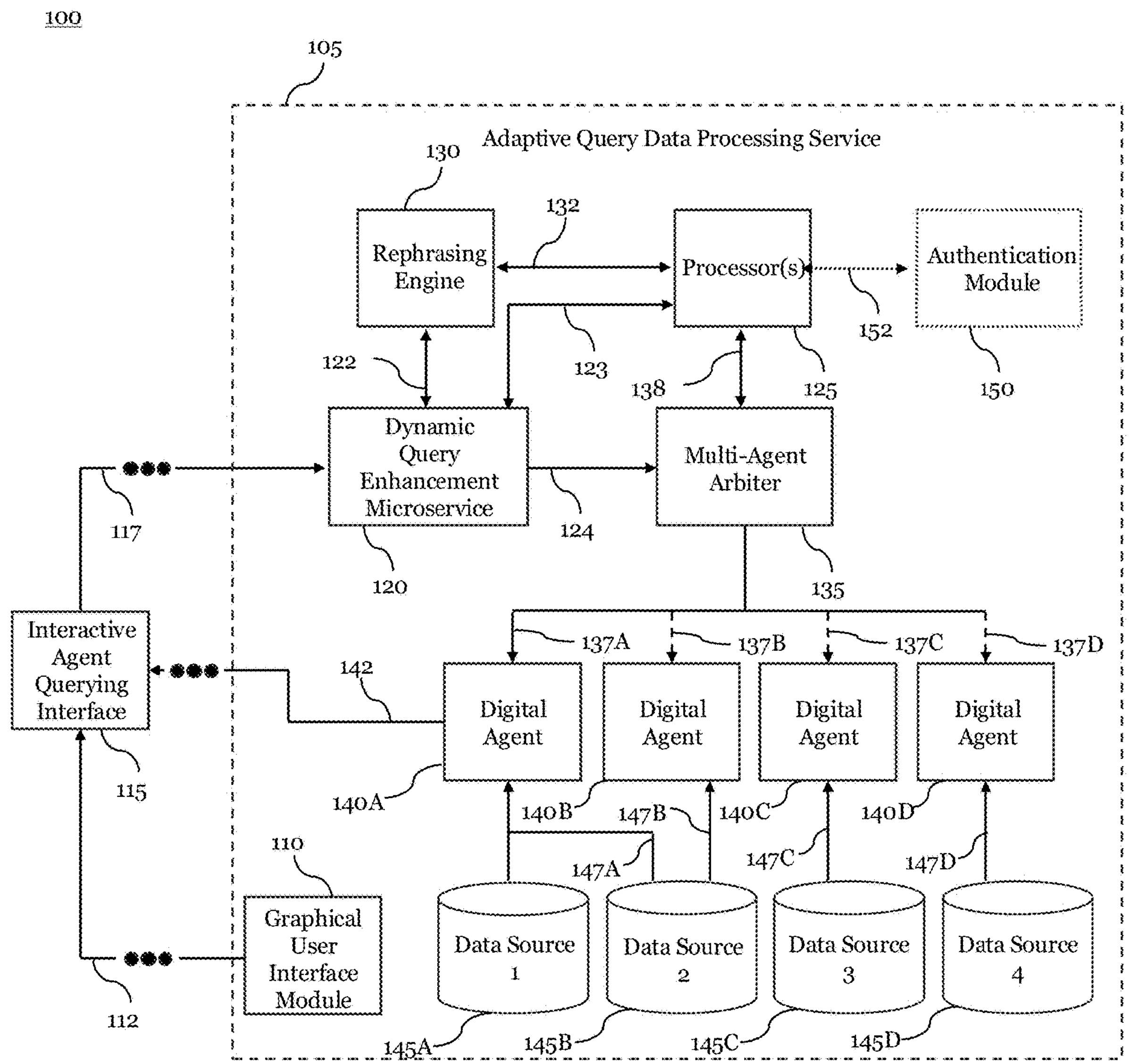
FIG. 1 illustrates a schematic representation of a system 100 in accordance with one or more embodiments of the present application.

As shown in FIG. 1, a system 100 may include an adaptive query data processing service 105 and an interactive agent querying interface 115. The adaptive query data processing service 105 and the interactive agent querying interface 115 may communicate via a computer network (e.g., via transmission of packets between the interactive agent querying interface 115 and the adaptive query data processing service 105 over a communication connection). For instance, adaptive query data processing service 105 may communicate with interactive agent querying interface 115 via one or more of communication connections 112, 117, and 142. A "communication connection" as described herein may refer to a wireless or wired channel that may be direct (e.g., directly between two devices) or indirect (e.g., involve multiple computers and/or processors within a computer network being used to relay information between two devices). In some examples, the interactive agent querying interface 115 may be located on a display device separate from but in communication with the adaptive query data processing service 110. The term "computer network" may refer to a system of interconnected computing devices configured to communicate with each other.

The systems and techniques described herein may be associated with one or more advantages as compared to other systems. For instance, the multi-agent arbiter described herein may be used to instantiate one digital agent of a group of digital agents and may forward query data to the one instantiated digital agent, where each digital agent may include one or more dedicated processors and one or more dedicated memories. Other techniques that do not employ a multi-agent arbiter may provide query data to all the digital agents in a group of digital agents. The processors of all digital agents performing operations in response to receiving query data may have increased energy consumption and may use an increased number of computational resources as compared to using processors of only one digital agent. Additionally, the cumulative uptime associated with using the processors of all digital agents may be increased as compared to the uptime associated with using processors of a single digital agent.

Additionally, the multi-agent arbiter may enable scalable digital agent selection. For instance, if a first user provides a user query whose associated query data is forwarded to a first digital agent and a second user provides a user query whose associated query data is forwarded to a second digital agent, a first digital response for the first digital agent and a second digital response for the second digital agent may be generated in parallel. By contrast, systems that forward query data associated with a user query to all digital agents may not be capable of generating digital responses for multiple user queries in parallel. Thus, the techniques described herein may enable efficient parallelization of the digital agents.

1.05 Adaptive Query Data Processing Service

As shown in FIG. 1, an adaptive query data processing service 105 may include a graphical user interface module 110, a dynamic query enhancement microservice 120, processor(s) 125, a rephrasing engine 130, a multi-agent arbiter 135, digital agents 140A through 140D, and data sources 145A through 145D. In some examples, the adaptive query data processing service 105 may additionally include an authentication module 150. Each of the components of adaptive query data processing service 110 may be referred to as "modules", "components", or "elements" without deviating from the scope of the present disclosure.

In some examples, each of at least a portion of the components of adaptive query data processing service 105 may be executed by a respective set of computers within a distributed network of computers (e.g., a cloud-based system). Additionally, or alternatively, each of at least a portion of the components of adaptive query data processing service 105 may be located on a single controller or may be located on any combination of multiple controllers configured to communicate with each other.

In some examples, adaptive query data processing service 105 may be a cloud-based application that is hosted on one or more remote servers accessible via the interactive agent querying interface 115. In such examples, the interactive agent querying interface 115 may interact with the adaptive query data processing service 110 using one or more network protocols (e.g., a Wireless Fidelity (Wi-Fi) protocol). The adaptive query data processing service 105 may provide the interactive agent querying interface 115 to a user upon establishment of an initial connection with the adaptive query data processing service 105 using the one or more network protocols. Accordingly, it shall be recognized that the modules of the adaptive query data processing service 105 may be executed by the one or more network of computers or servers, which may be specifically programmed or encoded to perform the several operations for generating a response to unrefined query data.

1.10 Graphical User Interface Module

One or more computers executing graphical user interface module 110 may function to render, via a computer network, an interactive agent querying interface 115 for receiving unrefined query data. For instance, the graphical user interface module 110 may perform server-side rendering (SSR), in which the graphical user interface module 110 may process a request from a client device (e.g., a device running a browser) and may construct a response including a fully rendered interactive agent querying interface 115. Alternatively, the graphical user interface module 110 may enable client-side rendering (CSR), in which the graphical user interface module 110 sends a script (e.g., Javascript) that renders the interactive agent querying interface 115 at the client device. Hybrid approaches may additionally be utilized, in which a portion of the rendering occurs at the graphical user interface module 110 and a script provided to the client device performs the remaining rendering. In some examples (e.g., in which a user pulls up the interactive agent querying interface 115 in a mobile or desktop application), the client device may store code (e.g., in a memory of the client device) that the client device may use to load at least a portion of the interactive agent querying interface 115. After performing any of these approaches, a user using the client device may have access to the adaptive query data processing service 105 via the interactive agent querying interface 115.

1.15 Interactive Agent Querying Interface

A client device may receive information (e.g., HTML files, CSS files, Javascript files) that the client device may use to generate interactive agent querying interface 115. Additionally, or alternatively, the client device may use information stored at the client device to generate at least a portion of the interactive agent querying interface 115. Upon generating of the interactive agent querying interface 115, a user may use the interactive agent querying interface 115 to provide a query to adaptive query data processing service 105 (e.g., in the form of unrefined query data). It should be noted that there may be examples in which the unrefined query data is provided via a command line interface (CLI) or an application programming interface (API) without deviating from the scope of the present disclosure. Additionally, or alternatively, there may be examples in which queries are retrieved by the client device from a memory or computer database that the client device has access to before being provided to interactive agent querying interface 115.

In a non-limiting example, as described with reference to FIG. 6, a user may load an interactive agent querying interface 600 (e.g., via clicking a user interface input element on a browser or in a mobile or desktop application). The interactive agent querying interface 600 may include a display section 605 that displays a query provided by the user (e.g., textual data of unrefined query data) and responses to the query (e.g., a response to unrefined query data). For instance, user interface display elements 620A, 620B, and 620C may represent queries input previously by a user and user interface display elements 625A, 625B, and 625C may represent responses to each of the user-provided queries. For instance, user interface display element 625A may represent a response to the user query displayed by user interface display element 620A, user interface display element 625B may represent a response to the user query displayed by user interface display element 620B, and user interface display element 625C may represent a response to the user query displayed by user interface display element 620C.

Interactive agent querying interface 600 may further include a user interface input element 610 that stores a query (e.g., textual data of unrefined query data) when manipulated by user input. For instance, if a user types or pastes a user query into the user interface input element 610, the user interface input element 610 may store the associated data (e.g., in a memory or cache of the device hosting the interactive agent querying interface 600). Additionally, the user interface input element 610 may display the user query (e.g., until the user manipulates the user interface control element 615).

Interactive agent querying interface 600 may additionally include a user interface control element 615 that triggers the client device to transmit the query (e.g., the unrefined query data) to the adaptive query data processing service. When the user manipulates (e.g., clicks) the user interface control element 615, the user interface input element 610 may no longer display the user query. Additionally, the display section 605 may be updated to include a new user interface display element corresponding to the most recently entered user query. It should be noted that, in some examples, the user may, alternatively, trigger transmission of the query via pressing of a key (e.g., an enter key) without first manipulating the user interface control element 615.

1.20 Dynamic Query Enhancement Microservice

One or more computers executing dynamic query enhancement microservice 120 may function to convert a query received by a user (i.e., unrefined query data) to enhanced query data. The term "unrefined query data" may refer to data representing a query written in a human language in a format that is not bound by a strict, defined ruleset (e.g., not a structured query, such as a SQL query). The term "enhanced query data" may refer to query data restructured from unrefined query data via processing of the unrefined query data (e.g., processing through a rephrasing engine as described herein). To perform the conversion, the dynamic query enhancement microservice 120 may use processor(s) 125 via a first operable communication connection 123 to processor(s) 125. It should be noted that there may be examples in which the dynamic query enhancement microservice 120 includes processors that may perform the functions of processor(s) 125 without deviating from the scope of the present disclosure.

Conversion of Unrefined Query Data to Embeddings

The processor(s) 125, via the first operable communication connection 123, may obtain unrefined query data from interactive agent querying interface 115 (e.g., via user input) and may convert the unrefined query data to a set of embeddings. The terms "set of embeddings" or "embeddings" may refer to a vector representation of the unrefined query data. In some examples, the vector representation may be generated via an input of the unrefined query data to an embeddings model. An embeddings model, as described herein, may refer to a type of machine learning model that represents textual data (such as a sequence of words) as a point within a vector space. Text with higher semantic similarity may be mapped to points that are closer together in this space. As a result, embedding models may allow for similarity comparisons by analyzing the distances between vectors. Examples of embeddings models may include Word2Vec, BERT, and fastText, among others.

In a non-limiting example, as depicted in FIG. 2, dynamic query enhancement microservice 120A may receive unrefined query data 205 from an interactive agent querying interface and may relay the unrefined query data 205 to processor(s) 125A. Processor(s) 125A may convert the obtained unrefined query data 205 to a set of embeddings. It should be noted that, in some examples, dynamic query enhancement microservice 120A may be an example of a dynamic query enhancement microservice 120 as described with reference to FIG. 1 and processor(s) 125A may be an example of processor(s) 125 as described with reference to FIG. 1.

Searching a Computer Database for Historical User Dialogue Data

After converting the unrefined query data to the set of embeddings, the processor(s) 125 may construct a database search query using the set of embeddings and one or more logical search parameters. The term "logical search parameters" may refer to one or more parameters that define constraints for the search. For instance, an example of a logical search parameter may include a recency threshold (e.g., a temporal threshold) that indicates to only select data that is within a threshold time of a time associated with the database search query (e.g., a time at which the database search query is constructed, a time indicated by the database search query, a time at which the database search query is received). Alternatively, the recency threshold may indicate to only select data that is within a current session or within a threshold number of most recent sessions, where a "session" may refer to a temporary interactive exchange between a user and the adaptive query data processing service. In some examples, the database search query may have a structured format according to a predefined ruleset (e.g., the database search query may be a SQL query).

The processor(s) 125, in some examples, may execute a search of a computer database using the database search query. The term "computer database" may refer to a systematically arranged collection of data. The computer database of the present disclosure may be an example of a vector database, where a vector database may refer to a database that stores data in a vector format. A vector database may be searched using indexing techniques (e.g., Approximate Nearest Neighbor (ANN)) that enable vectors similar to a provided vector to be found without searching each entry of the vector database.

In the present disclosure, the computer database may store embeddings of historical user dialogue data, where the term "historical user dialogue data" may refer to previously received unrefined query data and responses generated for the previously received unrefined query data. Additionally, in some examples, the computer database may store the textual content of the historical user dialogue data.

To execute a search of the computer database, the processor(s) 125 may provide the set of embeddings for the unrefined query data to the computer database and may retrieve historical user dialogue data within a threshold distance of the set of embeddings. Additionally, the processor(s) 125 may filter the historical user dialogue data to conform to constraints defined by the logical search parameters (e.g., may only select historical user dialogue data that satisfies the recency threshold). By performing the search, the processor(s) may extract the historical user dialogue data from the computer database.

In a non-limiting example, as described in FIG. 2, processor(s) 125A may construct a database search query 210 using the set of embeddings of unrefined query data 205 and logical search parameters and may execute a search of computer database 215 using the database search query 210. Additionally, the processor(s) 125A may extract historical user dialogue data 220 based on executing the search.

Construction and Use of a Rephrasing Engine Prompt

After extracting the historical user dialogue data from the computer database, the processor(s) 125A may construct a rephrasing engine prompt using the extracted historical user dialogue data and the unrefined query data. The term "rephrasing engine prompt" may refer to a sequence of textual data that includes textual data of the historical user dialogue data and textual data of the unrefined query data. Constructing the rephrasing engine prompt may include combining the textual data of the historical user dialogue data and the unrefined query data.

Upon constructing the rephrasing engine prompt, the processor(s) 125A may transmit the rephrasing engine prompt to rephrasing engine 130. The transmitting may be performed over communication connection 132. Alternatively, it should be noted that there may be examples where the processor(s) 125A may transmit the rephrasing engine prompt to dynamic query enhancement microservice 120, which may forward the rephrasing engine prompt to rephrasing engine 130. For instance, processor(s) 125 may transmit the rephrasing engine prompt over communication connection 123 and dynamic query enhancement microservice 120 may forward the rephrasing engine prompt over communication connection 122.

After rephrasing engine 130 receives the rephrasing engine prompt, dynamic query enhancement microservice 120 may receive enhanced query data output by the rephrasing engine 130 and may transmit, to multi-agent arbiter 135, the enhanced query data. The enhanced query data may be transmitted via an API defined for communication between the dynamic query enhancement microservice 120 and the multi-agent arbiter 135. Additionally, or alternatively, the enhanced query data may be provided via a shared communication protocol (e.g., a wired or wireless protocol) that enables dynamic query enhancement microservice 120 to encode the enhanced query data into a signal and for multi-agent arbiter 135 to decode the signal.

In a non-limiting example, as described with reference to FIG. processor(s) 125A may construct a rephrasing engine prompt 225 and may provide the rephrasing engine prompt 225 to rephrasing engine 130A. The rephrasing engine 130A may generate enhanced query data 240 and may provide enhanced query data 240 to dynamic query enhancement microservice 120A. In some examples, rephrasing engine 130A may be an example of a rephrasing engine 130 as described with reference to FIG. 3.

1.25 Processor(s)

Computer processor(s) 125 may function to execute operations corresponding to other modules of the adaptive query data processing service 105 (e.g., dynamic query enhancement microservice 120, multi-agent arbiter 135, authentication module 150). The computer processor(s) 125 may include a single processing unit, or, alternatively, may encompass multiple processing units that function in parallel or independently. In embodiments where multiple processors are utilized, these processors may reside on the same physical host system or may be distributed across multiple host systems, potentially located in geographically disparate locations.

In certain implementations, the computer processor(s) 125 may be specifically configured to allocate specific subsets of processing units to particular functions or modules thereby forming one or more distinct microservices, which may be specifically configured with software applications, scripts, computer logic, and/or control instructions for executing the plurality of modules within the adaptive query data processing service 105. For example, a dedicated processor or subset of processors may be specifically assigned and/or programmed to perform operations associated with dynamic query enhancement microservice 120, while another processor or subset of processors may be tasked with operations associated with multi-agent arbiter 135. This modular allocation of processing resources can facilitate efficient parallel processing, reduce latency, and improve overall system throughput by ensuring that specialized processors handle designated tasks.

Additionally, the computer processor(s) 125 may be configured with various control logic and processing pipelines that optimize data flow between system components. In embodiments involving multi-core processors or multi-processor systems, individual cores or processors may be dynamically assigned to handle computationally intensive tasks. These processors may further support various modes of operation, such as single-instruction-multiple-data (SIMD) or multi-threading, enabling simultaneous processing of large datasets and further enhancing system performance.

In some instances, the computer processor(s) 125 may include specialized processors, such as graphics processing units (GPUs), tensor processing units (TPUs), or other application-specific integrated circuits (ASICs), to perform specialized functions, such as machine learning model training, large-scale data analytics, or secure computation. The inclusion of such specialized processors can further optimize the performance of the adaptive query data processing service 105 in specific application domains, ensuring that tasks requiring high computational power are executed efficiently.

1.30 Rephrasing Engine

One or more computers executing rephrasing engine 130 may function to convert a rephrasing engine prompt into enhanced query data. For instance, the rephrasing engine 130 may have a communication connection to a language model that transforms the unrefined query data (e.g., within the rephrasing engine prompt) to enhanced query data restructured based on processing the rephrasing engine prompt. A language model as described herein may refer to a machine learning model configured to process textual data representing a language. For instance, a language model may be configured to predict one or more textual outputs from a given input sequence. In the present application, a machine learning model may be configured to predict enhanced query data from a rephrasing engine prompt including unrefined query data and/or historical user dialogue data. The language model may be trained on corpus of textual data (e.g., a corpus of textual data including examples of enhanced query data and the corresponding unrefined query data and/or historical user dialogue data). It should be noted that there may be examples in which the rephrasing engine 130 includes the language model without deviating from the scope of the present disclosure. Additionally, it should be noted that the rephrasing engine prompt may be processed through the language model using processor(s) 125, processors internal to rephrasing engine 130, or processors coupled with a system that includes the language model (e.g., in examples in which the language model is on a separate system from the rephrasing engine).

In a non-limiting example, as described with reference to FIG. 2, rephrasing engine 130A may receive a rephrasing engine prompt 225 from processor(s) 125A and may provide the rephrasing engine prompt 230 to language model 235. Language model 235, in response to receiving rephrasing engine prompt 230 as an input, may output enhanced query data 240 to rephrasing engine 230. Rephrasing engine 130A may provide the enhanced query data 240 to dynamic query enhancement microservice 120A.

1.35 Multi-Agent Arbiter

One or more computers executing multi-agent arbiter 135 may function to select a digital agent to which to forward enhanced query data and to forward the enhanced query data to the selected digital agent. In a non-limiting example, as depicted in FIG. 1, multi-agent arbiter 135 may have selective operable control of digital agents 140A through 140D.

For instance, the multi-agent arbiter may have a first communication connection 137A to digital agent 140A, a second communication connection 137B to digital agent 140B, a third communication connection 137C to digital agent 140C, and a fourth communication connection 137D to digital agent 140D. As depicted in FIG. 1, digital agent 137A may be the selected digital agent. Accordingly, multi-agent arbiter may forward the enhanced query data to digital agent 137A.

The multi-agent arbiter 135 may include a language model that generates at least one digital agent selection inference based on an input of an agent selection prompt including the enhanced query data. The term "digital agent selection inference" may refer to one or more outputs of the language model that the multi-agent arbiter may use to determine which digital agent to forward enhanced query data to. For instance, the digital agent selection inference may include a value (e.g., a confidence value) for each digital agent indicating a likelihood that the enhanced query data is related to the respective digital agent. The term "agent selection prompt" may refer to a sequence of textual data that includes textual data of the enhanced query data. Without deviating from the scope of the present disclosure, it should be noted that there may be examples in which the multi-agent arbiter 135 has a communication connection to the language model (e.g., in examples in which the language model is located on a separate, external system).

The multi-agent arbiter 135 may also include one or more memories specially encoded with executable digital agent selection logic. The term "digital agent selection logic" may refer to information stored within the one or more memories that processor(s) 125 may use to convert the at least one digital agent classification inference to an agent selection control signal. The information, in some examples, may include one or more parameters (e.g., thresholds or range values) that the processor(s) 125 may retrieve to determine which digital agent to generate an agent selection control signal for. Additionally, or alternatively, the information may include executable code that processor(s) 125 may execute to select a digital agent from the at least one digital agent classification inference. Additionally, or alternatively, the information may include heuristics defining a set of rules for selecting a digital agent from the at least one digital agent classification inference. Additionally, or alternatively, the information may include a machine learning model (e.g., a classification head) that the processor(s) 125 may use to process the at least one digital agent classification inference that may map the at least one digital agent classification inference to an identifier or index associated with a particular digital agent.

The multi-agent arbiter 135 may also include a communication connection to processor(s) 125 (e.g., communication connection 138), where the processor(s) 125 may receive the enhanced query data from the multi-agent arbiter and may process the enhanced query data via the language model of the multi-agent arbiter 135 to generate the at least one digital agent classification inference. The processor(s) 125 may additionally extract the executable digital agent selection logic from the one or more memories of the multi-agent arbiter 135 and may apply the executable digital agent selection logic to the at least one digital agent classification inference. By applying the executable digital agent selection logic to the at least one digital agent classification inference, the processor(s) 125 may generate an agent selection control signal that instantiates a selected digital agent of a set of digital agents (e.g., digital agent 140A) for automatically executing one or more computer-based operations based on receiving the enhanced query data. The term "agent selection control signal" may refer to a control signal that the multi-agent arbiter 135 may provide to a particular digital agent (e.g., to a processor of the digital agent) that indicates to use the digital agent.

In a non-limiting example, as described with reference to FIG. 3, dynamic query enhancement microservice 120B may transmit enhanced query data 240A to multi-agent arbiter 135A and multi-agent arbiter 135A may forward enhanced query data 240A to processor(s) 125B. Processor(s) 125B may provide an agent selection prompt 315 to language model 305 and may receive at least one digital agent classification inference 320 from language model 305 in response to the provided agent selection prompt 315. Processor(s) 125B may extract digital agent selection logic 330 from memory 310 (e.g., via a provision of a digital agent selection logic request 325 to memory 310) and may apply the digital agent selection logic 330 to the at least one digital agent classification inference 320 to generate an agent selection control signal 335.

Initializing the Language Model

To initialize the language model that generates the at least one digital agent classification inference, the digital agent arbiter 135 may have electronic access to a memory of adaptive query data processing service 105 from which the digital agent arbiter 135 may retrieve, for each of digital agents 140A through 140D, respective textual data including a description of the digital agent. Additionally, the digital agent arbiter 135 may provide, to the language model, the respective textual data for each of digital agents 140A through 140D. The language model, upon receiving the respective textual data, may output sets of embeddings based on the provided textual data which the digital agent arbiter 135 may retrieve. The digital agent arbiter 135 may store the sets of embeddings at one or more reference memories of the adaptive query data processing service 105.

Upon receiving enhanced query data, the digital arbiter 135 may retrieve the sets of embeddings from the one or more reference memories. The digital arbiter 135 may provide, to the language model, the sets of embeddings and may perform processing of the enhanced query data via the language model based on the provided sets of embeddings.

In a non-limiting example, as described with reference to FIG. 5, processor(s) 125C may provide, to memory 505 of an adaptive query data processing service, a textual data request 510 and may receive textual data 515 for each of a set of digital agents. The processor(s) 125C may provide the textual data 515 to language model 305A and may receive sets of embeddings 520 in response to providing the textual data 515 to language model 305A. The processor(s) 125C may provide the sets of embeddings 520 to reference memory 525 for storage at reference memory 525. The processor(s) 125C may (e.g., upon receiving enhanced query data 240C from a dynamic query enhancement microservice) may retrieve the sets of embeddings 520 from reference memory 525 and may provide the sets of embeddings 520 to language model 305A. Additionally, the processor(s) 125C may provide the enhanced query data 240C to language model 305A.

It should be noted that the processor(s) 125C, without deviating from the scope of the present disclosure, may be an example of processor(s) 125B as described with reference to FIG. 3, processor(s) 125A as described with reference to FIG. 2, and/or processor(s) 125 as described with reference to FIG. 1. Additionally, or alternatively, language model 305A may be an example of a language model as described with reference to FIG. 3. Additionally, or alternatively, enhanced query data 240C may be an example of enhanced query data 240B as described with reference to FIG. 4, enhanced query data 240A as described with reference to FIG. 3, and/or enhanced query data 240 as described with reference to FIG. 2.

1.40 Digital Agents

One or more computers executing a respective digital agent (e.g., one of digital agents 140A, 140B, 140C, and 140C) may function to automatically execute one or more computer-based operations based on receiving the enhanced query data. The term "computer-based operations" may refer, in some examples, to generating a response to unrefined query data and transmitting the response to an interactive agent querying interface 115.

Each digital agent may have electronic access to one or more data sources (e.g., computer data sources). For instance, digital agent 140A may have electronic access to data sources 145A and 145B (e.g., via communication connection 147A), digital agent 140B may have electronic access to data source 145B (e.g., via communication connection 147B), digital agent 140C may have electronic access to data source 145C (e.g., via communication connection 147C), and digital agent 140D may have electronic access to data source 145D (e.g., via communication connection 147D). It should be noted that the digital agents depicted in FIG. 1 are exemplary and that a fewer or greater number of digital agents may be used in adaptive query data processing service 105 without deviating from the scope of the present disclosure. Additionally, the communication connections between a digital agent and its respective data source(s) may vary from that depicted in FIG. 1 without deviating from the scope of the present disclosure (e.g., some digital agents may have more than 2 data sources to which they have electronic access).

Each of digital agents 140A through 140D may have a respective one or more agent-specific processors. The term "agent-specific processor" may refer to the processor for a particular digital agent being distinct to that digital agent (e.g., the processor is not used by another digital agent or dedicated to one digital agent). Alternatively, there may be examples in which digital agents share one or more processors without deviating from the scope of the present disclosure (e.g., processor(s) 125 perform one or more functionalities associated with the agent-specific processors for one or more digital agents). The one or more agent-specific processors may include a single processing unit, or, alternatively, may encompass multiple processing units that function in parallel or independently. In embodiments where multiple processors are utilized, these processors may reside on the same physical host system or may be distributed across multiple host systems, potentially located in geographically disparate locations.

Each of digital agents 140A through 140D may further include a respective one or more agent-specific memories. The term "agent-specific memory" may refer to the memory for a particular digital agent being distinct to that digital agent (e.g., the memory is not used by another digital agent or is dedicated to one digital agent). Alternatively, there may be examples in which digital agents share one or more memories without deviating from the scope of the present disclosure. The one or more agent-specific memories may function to store information used by the one or more agent-specific processors. For instance, the one or more agent-specific memories may store textual data used in constructing a language model prompt.

In some examples, each of digital agents 140A through 140D may have a communication connection with a respective language model. Without deviating from the scope of the present disclosure, it should be noted that there may be examples in which multiple digital agents may have a respective communication connection with a shared language model. Alternatively, it should be noted that there may be examples in which each digital agent includes a respective language model.

In a non-limiting example, as depicted with reference to FIG. 4, a digital agent 140E may include agent-specific processor(s) 402 and agent-specific memory 420. Additionally, digital agent 140E may have a respective communication connection with each of multi-agent arbiter 135B, interactive agent querying interface 115A, data source 145E, and language model 435. In some examples, digital agent 140E may be an example of one of digital agents 140A through 140D as described with reference to FIG. 1; multi-agent arbiter 135B may be an example of multi-agent arbiter 135A as described with reference to FIG. 3 and/or multi-agent arbiter 135 as described with reference to FIG. 1; interactive agent querying interface 115A may be an example of an interactive agent querying interface 115 as described with reference to FIG. 1; and data source 145E may be an example of one or more of data sources 145A through 145D as described with reference to FIG. 1.

Instantiating a Digital Agent

After multi-agent arbiter 135 selects digital agent 140A, multi-agent arbiter 135 may transmit an agent selection control signal to digital agent 140A. Additionally, multi-agent arbiter 135 may forward enhanced query data to digital agent 140A. The enhanced query data and the agent selection control signal may be received by the one or more agent-specific processors of digital agent 140A. Receiving the agent selection control signal and/or the enhanced query data may instantiate digital agent 140A. Instantiating digital agent 140A may refer to triggering the one or more agent-specific processors from an inactive state to an active state. In an active state, the one or more agent-specific processors may perform steps as described herein to generate a digital response to unrefined query data.

Both the agent selection control signal and the enhanced query data may be forwarded over communication connection 137A. Alternatively, each of the agent selection control signals and the enhanced query data may be transmitted over separate communication connections. It should be further noted that there may be examples where the agent selection control signal may include the enhanced query data.

In a non-limiting example, as described with reference to FIG. 4, multi-agent arbiter 135B may provide enhanced query data 240B and agent selection control signal 335A to digital agent 140E (e.g., to agent-specific processor(s) 402). It should be noted that enhanced query data 240B may be an example of enhanced query data 240A as described with reference to FIG. 3 and/or enhanced query data 240 as described with reference to FIG. 2. Additionally, or alternatively, agent selection control signal 335A may be an example of agent selection control signal 335 as described with reference to FIG. 3.

Retrieving Contextual Data

Upon receiving the agent selection control signal and/or the enhanced query data, the one or more agent-specific processor(s) of digital agent 140A may access the data within data source 145A and/or data source 145B. For instance, the one or more agent-specific processor(s) may construct a contextual data query to be provided to data source 145A and/or data source 145B. In some examples, constructing the contextual data query may include converting the enhanced query data to a set of embeddings and adding, to the contextual data query, the set of embeddings of the enhanced query data.

The one or more agent-specific processor(s) of digital agent 140A may perform a search of data source 145A and/or data source 145B using the contextual data query. In some examples, data sources 145A and/or 145B may each be a vector database. In such examples, the one or more agent-specific processor(s) of digital agent 140A may perform the search by one or more indexing techniques (e.g., ANN) that enables vectors similar to a provided vector to be found without searching each entry of the vector database. Upon finding a similar enough vector within data sources 145A and/or 145B to the vector of the enhanced query data, digital agent 140A may extract textual content corresponding to the found vector.

In a non-limiting example, as described with reference to FIG. 4, agent-specific processor(s) 402, upon receiving enhanced query data 240B may construct a contextual data query 405 and perform a search of data source 145E. Based on performing the search, the agent-specific processor(s) 402 may receive contextual data 410 from the data source 145E.

Constructing a Language Model Prompt

Upon receiving the contextual data from data source 145A and/or 145B, the agent-specific processor(s) of digital agent 140A may construct a language model prompt from the enhanced query data and the contextual data. The language model prompt may include tokens of the enhanced query data and contextual data, if present.

In some examples, the language model prompt may include additional textual data retrieved from the one or more agent-specific memories of digital agent 140A. For instance, the one or more agent-specific processors of digital agent 140A may retrieve, from the one or more agent-specific memories, first textual data including a first textual description of a role of the selected digital agent and second textual data including a second textual description of a set of rules for the selected digital agent to follow (e.g., an indication of allowed and/or prohibited behaviors for the digital agent). The one or more agent-specific processors of digital agent 140A may further construct the language model prompt from the first textual data and the second textual data. For instance, the language model prompt may include tokens of the first textual data and the second textual data.

In a non-limiting example, as described with reference to FIG. 4, agent-specific processor(s) 402, upon receiving enhanced query data 240B and contextual data 410 may construct language model prompt 415. Additionally, agent-specific processor(s) 402 may retrieve, from agent-specific memory 420, textual data 425 that may be included in the language model prompt 415. The textual data 425 may include a first textual description of a role of the selected digital agent and/or a second textual description of a set of rules for the selected digital agent to follow. In some examples, to request the textual data 425, agent-specific processor(s) 402 may construct a textual data request 415 and may provide the textual data request 415 to memory 420.

Generating a Response to Unrefined Query Data

Upon constructing the language model prompt, digital agent 140A (e.g., via the one or more agent-specific processors) may provide the language model prompt to the respective language model over the respective communication connection for digital agent 140A. The language model 435 may output a response to the unrefined query data, which the one or more agent-specific processors of the digital agent 140A may receive. Digital agent 140A may provide the response to the unrefined query to interactive agent querying interface 115 (e.g., via communication connection 142, which may be implemented by a network of computers).

In a non-limiting example, as depicted with reference to FIG. 4, agent-specific processor(s) 402 may provide language model prompt 430 to language model 435. Language model 435 may output a response 440, which processor(s) 402 may receive. Processor(s) 402 may provide the response 445 to interactive agent querying interface 115A via a computer network.

Digital Agent Tasks

In some examples, digital agents 140A through 140D may perform dedicated tasks based on a reception of an agent selection control signal from a multi-agent arbiter 135. For instance, one or more of digital agents 140A through 140D may generate a digital artifact (e.g., a report) that may be logged or provided to the interactive agent querying interface 115. Additionally, or alternatively, one or more of digital agents 140A through 140D may perform user account management (e.g., creating an account, updating an account, deleting an account). In some examples, the dedicated tasks may be performed in real-time.

1.45 Data Sources

Adaptive query data processing service 105 may include a set of data sources electronically accessible by one or more digital agents (e.g., data sources 145A, 145B, 145C, and 145D). In some examples, each of data sources 145A through 145D may be a vector database. Additionally, or alternatively, each of data sources 145A through 145D may be a tabular database (e.g., a SQL database), a non-tabular database (e.g., a NoSQL database), a knowledge base, or an unstructured digital artifact (e.g., an unstructured document). Each of data sources 145A through 145D may store contextual data.

Each of digital agents 140A through 140D may be specifically permissioned to particular data sources. For instance, digital agent 140A may be specifically permissioned to data sources 145A and 145B; digital agent 140B may be specifically permissioned to data source 145B; digital agent 140C may be specifically permissioned to data source 145C; and digital agent 140D may be specifically permissioned to data source 145D. The term "specifically permissioned" may refer to a particular digital agent having access to a limited subset of total available data sources.

In some examples, a data source may include user-specific information. In such examples, a digital agent accessing the data source may construct a language model prompt only from contextual data corresponding to the user that sent a particular unrefined query. To accomplish this, the digital agent may filter out contextual data associated with other users (e.g., contextual data linked to a user identifier different from a user identifier of the user that sent a particular unrefined query) and may retain contextual data associated with the user (e.g., contextual data linked to a user identifier of the user that sent a particular refined query). In other examples, a data source may include data accessible to multiple users (e.g., common information for all users). When accessing such a data source, the digital agent may refrain from filtering out contextual data according to a user identifier.

1.50 Authentication Module

One or more computers executing authentication module 150 may function to limit the information that adaptive query data processing service 105 uses in generating a response to unrefined query data according to the user linked to a particular unrefined query data. For instance, when unrefined query data is received via communication connection 117, a signal including the unrefined query data may further include an identifier of a user that transmitted the unrefined query data. Authentication module 150, via a communication connection 152 to processor(s) 125 may extract, from the unrefined query data, the identifier of the user and may provide an indication to dynamic query enhancement microservice 120 and/or digital agents 140A through 140D to limit information retrieved to that linked to the extracted user identifier. Accordingly, when processor(s) 125 search entries of the computer database for dynamic query enhancement microservice 120, the processor(s) 125 may filter out historical user dialogue data linked to user identifiers distinct from the extracted user identifier and may keep historical user dialogue data linked to the same user identifier. Accordingly, each instance of the historical user dialogue data may have a corresponding entry in the computer database with the identifier of the user. Additionally, when digital agents 140A through 140D search a data source (e.g., data sources 140A through 140D), the digital agents 140A through 140D may filter out contextual data linked to user identifiers distinct from the extracted user identifier and may keep contextual data linked to the same user identifier. Additionally, or alternatively, the systems and methods described herein may include the systems and methods described in U.S. patent application Ser. Nos. 19/079,698, 19/259,230, and 19/067,102; each of which is incorporated herein by reference in its entirety for all purposes.

2.00 Method for Automatically Classifying Distributed User State Data Across a Plurality of Heterogeneous Data Sources As shown in FIG. 2, a method 200 for automatically classifying distributed user state data across a plurality of heterogeneous data sources may include receiving encrypted user state data (S210), generating a normalized user-state data structure based on the encrypted user state data (S220), generating a completion-state classification vector and a real-time interactive visualization based on the normalized user-state data structure (S230), and automatically propagating the normalized user-state data and/or completion-state data to one or more third-party computing services (S240).

User-related data may be generated across many different applications, services, and user interface workflows, each of which may store user-related information using different schemas, identifiers, and data types. For example, a first application may store a verification indicator as a Boolean value labeled "verified_flag," a second application may store a corresponding indicator as a timestamp labeled "verification_date," and a third application may store a categorical value labeled "status_code." Determining whether a user satisfies a machine-evaluated state condition across such applications may therefore require repeatedly parsing heterogeneous data records, identifying semantically corresponding fields, converting data types, and applying conditional evaluation logic across multiple sources.

The solution set forth by the systems and methods herein may address this technical problem by generating, via one or more processors, a normalized user-state data structure comprising a user table and a plurality of composite state tables. Each composite state table may define a fixed set of state-related data element columns, and each user row in the user table may store reference pointers linking the user to corresponding composite state rows. By embedding normalized values into these composite state tables at the time encrypted user state data is received, subsequent state evaluations may operate directly on normalized columns rather than repeatedly reprocessing heterogeneous input data.

For example, in an implementation in which a user's state is evaluated across ten applications, where each application contributes twenty state-related data elements, a conventional approach may require parsing and transforming approximately two hundred heterogeneous fields for each evaluation cycle. If such evaluation occurs one hundred times, such as in response to interface events, third-party queries, or synchronization triggers, the computing system may perform approximately 20,000 parsing and transformation operations. Using the normalized user-state data structure generated according to the application, normalization may occur once per incoming update, after which each evaluation may reference existing composite state table columns via stored pointers. As a result, the number of repeated transformation operations may be reduced to approximately 2,000-6,000 operations, corresponding to a reduction of approximately 70-90%.

Such reduction arises from the specific architectural arrangement described herein, in which normalized composite state tables persist normalized values and reference-linked associations, thereby eliminating repeated schema reconciliation across evaluation cycles. Such approach improves processor efficiency, reduces memory access overhead, and enables deterministic state evaluation at machine speeds. Performing such operations in the human mind is not practical, as a human would be required to repeatedly track, translate, and reconcile hundreds of heterogeneous identifiers, data formats, and reference relationships across rapid evaluation cycles while maintaining consistency across updates. Such cognitive processing cannot scale with data volume, cannot execute at computational speeds, and cannot reliably reproduce identical results across repeated evaluations.

While normalized composite state tables may reduce repeated schema translation, evaluating whether a user satisfies a multi-element state condition may still require inspecting multiple normalized columns within a composite state row. As the number of composite states grows, repeatedly evaluating column-level non-null conditions may introduce additional memory access operations and conditional checks proportional to the number of state-related data elements (e.g., 10,000, 100,000, 500,000, 10,000,000,000, etc.) associated with each composite state.

The systems and methods herein may further improve computational efficiency by generating a completion-state classification vector in which each index position corresponds to a respective composite state and stores a binary state-bit value indicating whether the composite state satisfies predefined machine-evaluated conditions. Once generated, determining whether a composite state is satisfied may be performed by reading a single index position of the completion-state classification vector, rather than re-evaluating multiple normalized columns across one or more composite state tables. Such access may be performed in constant time, $O(1)$, regardless of the number of underlying state-related data elements.

For example, in an implementation comprising fifty composite states, where each composite state is defined by twenty normalized state-related data elements, a conventional evaluation approach may require up to one thousand column inspections per evaluation cycle. Using the completion-state classification vector generated according to the application, each evaluation may instead require at most fifty index reads, and in many cases only a single index read when a specific composite state is queried. Such reduction transforms repeated multi-column evaluation into a deterministic, index-addressable operation, significantly reducing processor cycles and memory access overhead.

Such improvement is enabled by the specific vectorized representation described herein, which decouples state evaluation from underlying table traversal and replaces iterative condition checking with direct memory addressing. Performing such constant-time evaluation is not practically achievable in the human mind, as a human would be required to repeatedly track, recall, and evaluate the satisfaction state of dozens of composite conditions derived from hundreds of underlying data elements, while consistently updating those determinations across rapid system events. The systems and methods herein instead enable a computing system to encode state satisfaction as machine-readable binary values stored in addressable memory locations.

Although the completion-state classification vector enables constant-time determination of state satisfaction, distributing updates to downstream services may still impose overhead if entire vectors or normalized data structures are repeatedly transmitted in response to incremental changes. In distributed computing environments where user-state data is frequently updated, such full-data propagation may increase network utilization, processing latency, and synchronization overhead across connected services.

The systems and methods herein further improve distributed performance by detecting changes at the index-position level of the completion-state classification vector and propagating only delta updates corresponding to modified binary state-bit values. When a binary state-bit value at a particular index position transitions between values, the systems and methods herein may transmit an update payload identifying the index position and the updated binary value, without regenerating or retransmitting the full vector or reprocessing the normalized user-state data structure.

For example, in an implementation comprising a completion-state classification vector with fifty index positions, a conventional synchronization approach may transmit all fifty state values whenever any underlying user-state data changes. If state updates occur one hundred times, such approach may transmit five thousand state values. Using the delta-based propagation performed by the systems and methods herein, only the modified index positions may be transmitted. If an average of three composite states change per update cycle, approximately three hundred state values may be transmitted, corresponding to a reduction in transmitted state data of approximately ninety-four percent.

Such reduction may be enabled by the architectural separation between normalized data storage, vectorized state evaluation, and index-position-level change detection implemented by the systems and methods herein. By encoding composite state satisfaction as addressable binary values and monitoring transitions at specific index positions, the systems and methods herein may enable selective propagation that reduces bandwidth consumption, lowers processor utilization at receiving services, and decreases end-to-end update latency.

Performing such selective, event-driven propagation is not practical in the human mind. A human would be required to continuously monitor hundreds of evolving data elements, determine which composite conditions changed, and selectively notify multiple downstream consumers with precise state identifiers and updated values in real time. Such cognitive processing cannot operate at network speeds, cannot reliably isolate minimal deltas across rapid updates, and cannot maintain consistent synchronization across distributed computing environments.

User interfaces that present progress, status, or task completion information may traditionally rely on periodic polling of backend services or repeated retrieval of underlying datasets to determine whether user state has changed. Such approaches may require re-fetching tables, re-evaluating multiple state conditions, and re-rendering large portions of the interface even when only a small subset of state information has changed. As update frequency increases, such polling-based mechanisms may introduce stale displays (e.g., outdated data), unnecessary redraw operations, increased processor utilization on client devices, and degraded user responsiveness.

The systems and methods herein may address such graphical user interface limitations by generating an interactive, segmented graphical visualization in which each visual portion is deterministically mapped to a corresponding index position of the completion-state classification vector. Each visual portion may represent a single composite state, and visual attributes of each portion may be directly derived from the binary state-bit value stored at the mapped index position. By aligning rendered interface elements directly with index-addressable state bits, visual state determination may be performed without recomputing underlying composite state tables or re-evaluating normalized columns.

In operation, updates to the graphical user interface may be driven by real-time broadcast messages generated in response to index position-level state changes. When a binary state-bit value transitions at a particular index position, the systems and methods herein may propagate a lightweight update identifying the affected index position and the updated binary value. A primary user interface controller node may receive such update and may update only the visual portion mapped to the identified index position, without refreshing unaffected interface elements or performing a full screen redraw (e.g., re-rendering).

For example, in an implementation comprising a segmented visualization with fifty visual portions, a conventional interface update approach may re-render all fifty portions upon each refresh cycle, even when only one composite state changes. If such refresh occurs one hundred times, approximately five thousand visual render operations may be performed. Using index-aligned updates driven by broadcast messages as described herein, only the affected visual portions may be updated. If an average of three composite states change per update cycle, approximately three hundred visual updates may be performed, corresponding to a reduction in visual rendering operations of approximately ninety percent. Such reduction may lower graphical processing load, reduce power consumption on client devices (e.g., improve battery life), and improve perceived interface responsiveness.

Additionally, by deriving visual state directly from binary state-bit values, the systems and methods herein may enable constant-time visual determination, O(1), for each visual portion. Determining whether a visual portion should appear completed or incomplete may require only a single index read rather than evaluation of multiple normalized columns or composite state conditions. Such approach decouples user interface behavior from underlying data traversal and enables deterministic, low-latency updates as state information changes.

Performing such real-time, index-aligned graphical updates is not practically achievable in the human mind. A human would be required to continuously monitor numerous evolving data elements across distributed sources, determine which composite states changed, map those changes to specific interface regions, and selectively update only the affected visual elements while preserving consistency across rapid update cycles. Such cognitive processing cannot operate at required rendering speeds (e.g., less than one millisecond), cannot maintain deterministic alignment between memory structures and interface elements, and cannot reliably scale as the number of states and update events increases.

Third-party applications may independently implement onboarding flows, feature gating logic, or verification checks to determine whether a user is eligible to access particular functions. In distributed environments, such applications may lack reliable visibility into whether a user has already satisfied machine-evaluated state conditions through other applications or workflows. As a result, users may be repeatedly prompted to perform redundant actions, applications may re-execute validation logic unnecessarily, and system resources may be consumed performing duplicative checks that have already been satisfied elsewhere.

The systems and methods herein may address such inefficiencies by enabling real-time third-party application control based on completion-state signals derived from the completion-state classification vector. After a third-party computing service is authorized to access completion-state data, the systems and methods herein may establish a bi-directional communication channel between one or more processors and a third-party application executing on a user device. Through such channel, positive and negative state-completion signals corresponding to specific composite states may be transmitted as machine-readable messages comprising a state identifier and a binary state-bit value.

In response to receiving positive state-completion signals, a third-party application may automatically inhibit execution of one or more application functions associated with composite states that are already satisfied. For example, when a binary state-bit value indicates that a verification or setup composite state is complete, the third-party application may disable redundant prompts, suppress repeated input requests, or bypass validation workflows that would otherwise be executed. Such behavior may reduce unnecessary user interactions and eliminate repeated processing associated with re-verifying completed conditions.

Conversely, in response to receiving negative state-completion signals, a third-party application may automatically surface available or unused functionality associated with composite states that remain unsatisfied. For example, when a binary state-bit value indicates non-satisfaction of a particular composite state, the third-party application may present a contextual interface element, recommendation panel, or notification indicating that a related feature or workflow is available. Such selective surfacing may be driven by precise state identifiers rather than heuristic inference or repeated data retrieval.

From a computational perspective, using completion-state signals to control third-party application behavior may significantly reduce redundant logic execution. In a conventional approach, an application may evaluate multiple user attributes or perform external lookups each time a gated function is accessed. If a third-party application includes twenty gated functions and each function performs a multi-condition evaluation upon invocation, hundreds, thousands, or millions of conditional checks may be executed during a user session. Using binary state-bit signals transmitted by the systems and methods herein, each gating decision may be reduced to a constant-time, O(1), evaluation of a received state identifier and binary value. Such reduction may decrease processor cycles associated with application-level validation logic by more than eighty percent in practical implementations.

Additionally, the systems and methods herein may enable third-party applications to unlock or provision system-generated credentials in response to positive state-completion signals. Such credentials may include access levels, entitlements, feature flags, usage thresholds, or recognition artifacts that were not previously available. Upon receipt of a positive state-completion signal indicating satisfaction of predefined conditions, a third-party application may automatically transition the user into an updated credential state without requiring additional user input or repeated verification logic.

Performing such coordinated, real-time application control is not practical in the human mind. A human operator would be required to track evolving completion states across multiple systems, determine which application functions should be enabled or disabled at any given moment, and manually synchronize such decisions across devices and services in real time. Such cognitive processing cannot reliably operate at application execution speeds, cannot scale with the number of gated functions, and cannot maintain consistent behavior across distributed environments.

Third-party applications may implement credentialing logic, entitlement checks, or access-level determinations that depend on whether a user has satisfied a defined set of machine-evaluated state conditions. In conventional systems, such credentialing logic may require repeated execution of validation workflows, external lookups, or manual approval processes each time a user attempts to access a protected capability. Such approaches may increase processing latency, introduce synchronization delays across services, and create inconsistent credential states when multiple applications independently evaluate the same underlying user information.

The systems and methods herein may improve credential provisioning by enabling automatic credential unlocking based on completion-state signals derived from the completion-state classification vector. After a third-party application receives one or more positive state-completion signals indicating satisfaction of predefined composite states, the third-party application may automatically unlock, generate, or provision a system-generated credential associated with the authorized user. Such credential may correspond to an access right, entitlement, status level, usage threshold, or feature capability that was not previously available.

For example, in an implementation in which a credential depends on completion of five composite states, a conventional approach may require evaluating twenty or more normalized attributes per composite state and re-executing such evaluations each time credential access is requested. If credential checks occur fifty times during a session, such approach may require thousands of conditional evaluations. Using the completion-state classification vector generated by the systems and methods herein, credential eligibility may be determined by reading five binary state-bit values corresponding to five index positions, resulting in a constant-time evaluation per credential check. Such approach may reduce credential-validation computations by approximately 85-95% in practical implementations.

Once a credential is unlocked, the third-party application may store a machine-readable representation of the credential locally, remotely, or within a service-managed credential registry. The application may also dynamically modify its user interface to reflect the unlocked credential by enabling previously inaccessible interface controls, exposing additional workflows, or displaying updated status indicators. Such interface changes may be driven directly by received completion-state signals rather than by repeated polling or revalidation operations.

The systems and methods herein may further support conditional or reversible credential states. When subsequent updates to the completion-state classification vector indicate that a previously satisfied composite state is no longer satisfied, a third-party application may suspend, downgrade, or revoke the associated credential. Such updates may be driven by delta-based propagation of index-position changes, allowing credential states to remain synchronized with underlying user-state data without requiring full reevaluation or reprocessing of normalized data structures.

Performing such automated credential unlocking and revocation is not practical in the human mind. A human would be required to continuously track completion states across multiple domains, remember which credentials depend on which combinations of conditions, and manually update access rights across applications as state changes occur. Such cognitive effort cannot reliably execute at machine speeds, cannot scale across large user populations, and cannot maintain consistent credential states across distributed systems.

In distributed computing environments, third-party services often require access to user-state information to perform segmentation, analytics, or conditional application logic. Conventional approaches may rely on duplicated data pipelines or service-specific data models that require repeated data extraction, transformation, and loading operations. Such approaches may introduce data inconsistency, increase storage duplication, and impose significant processing overhead as the number of integrated services grows.

The systems and methods herein may improve third-party data access by maintaining a completion-state propagation index that associates authorized users with one or more third-party computing services and stores machine-readable references to normalized user-state data structures, completion-state classification vectors, and associated visualizations. By centralizing these associations in a tabular, reference-based index, third-party services may retrieve or receive access to user-state information without duplicating underlying datasets or re-ingesting raw user data.

In some embodiments, third-party computing services may retrieve data using a pull-based access model, in which the service queries the completion-state propagation index to resolve references to normalized user-state data structures or completion-state classification vectors. In other embodiments, third-party computing services may receive push-based updates in response to detected changes in completion-state vectors. Such push-based propagation may be event-driven and delta-based, thereby avoiding repeated polling and reducing unnecessary network traffic.

For example, in an implementation where one hundred third-party services subscribe to state updates for one thousand users, a polling-based approach may require each service to repeatedly query for full state snapshots, resulting in millions of redundant requests per day. Using the event-driven propagation performed by the systems and methods herein, only index-position-level changes may be transmitted when state transitions occur. In practical deployments, such approach may reduce inter-service messaging volume by approximately 80-95% while also reducing synchronization latency from seconds or minutes to near real time.

The systems and methods herein may further support permission-scoped access to user-state data. Rather than duplicating datasets for each service, access constraints may be enforced by storing filtered references, reduced-dimension vectors, or access-scoped views within the completion-state propagation index. Such approach may allow a third-party service to access only selected index positions of a completion-state classification vector or only selected columns of a normalized composite state table, without modifying or duplicating the underlying data structures.

Such permission-scoped access may improve security and storage efficiency by eliminating redundant data copies while maintaining deterministic access boundaries. Performing such fine-grained, reference-based permission enforcement is not practical in the human mind, as it requires maintaining consistent mappings between users, services, permissions, and evolving state representations across large-scale distributed systems.

In addition to improving data access and synchronization, the systems and methods herein may enable cross-user analytics that are not feasible using heterogeneous or unnormalized data representations. When normalized user-state data structures and completion-state classification vectors are stored in a consistent schema, third-party services may execute machine-driven analytics across populations of users using index-aligned queries and vectorized operations.

For example, a third-party computing service may compute completion rates for a particular composite state by aggregating a single index position across thousands or millions of completion-state classification vectors. Such aggregation may be performed using vectorized or bitmap operations rather than by inspecting dozens of columns across multiple tables for each user. In practical implementations, such approach may reduce query execution time from minutes to milliseconds when operating at scale.

Additionally, third-party services may compute time-to-completion metrics by correlating binary state-bit transitions with timestamp-valued normalized state-related data elements. Because state transitions are detected at index-position granularity, services may track progression patterns without reprocessing historical user data. Such analytics may enable improved system monitoring, optimization of user workflows, and adaptive application behavior.

Performing such population-level analytics is not achievable in the human mind. A human would be required to manually track completion states across large user populations, reconcile heterogeneous representations, and consistently update aggregated statistics as new data arrives. Such operations require machine-level data access, indexing, and computation that exceed human cognitive capabilities.

Collectively, the systems and methods herein provide a technical improvement to computing systems by transforming fragmented, heterogeneous user-state inputs into a normalized, reference-linked data model; encoding multi-element state satisfaction into constant-time, index-addressable vectors; propagating state changes using event-driven deltas; and enabling real-time application control and analytics across distributed services. Such improvements reduce processor utilization (e.g., improve battery life), memory access overhead, network bandwidth consumption, and synchronization latency while enabling deterministic, scalable, and real-time state classification and utilization.

In some embodiments, completion-state classification vectors generated by the systems and methods herein may be used to control access to physical facilities or secured locations. For example, when a completion-state classification vector indicates that a composite state corresponding to identity verification or access authorization has transitioned to a satisfied state, the systems and methods herein may transmit an authorization signal to a physical access controller, such as a door lock, turnstile, kiosk, or badge reader. In response, the physical access controller may permit entry to a restricted area or enable a physical check-in process. Such physical control may be performed without requiring manual review, repeated credential entry, or reprocessing of underlying user-state data.

In some embodiments, completion-state transitions may trigger fulfillment or logistics actions involving physical goods. For example, when a completion-state classification vector indicates that onboarding, compliance, or payment-related composite states are satisfied, the systems and methods herein may transmit a release instruction to a warehouse management system or fulfillment controller. The fulfillment controller may then generate a shipping label, initiate packaging operations, or dispatch a physical item for delivery. Such actions may involve printers, conveyor systems, or inventory control hardware and represent real-world effects beyond data processing.

In some embodiments, completion-state signals may be used to activate, configure, or provision physical devices. For example, when a composite state associated with device enrollment or configuration becomes satisfied, the systems and methods herein may transmit configuration instructions to a device management controller that pushes settings to a managed device. Such settings may enable hardware components including cameras, biometric sensors, network interfaces, or secure storage modules. The resulting configuration may cause a physical device to change operational behavior in response to the completion-state classification vector.

In some embodiments, completion-state classification vectors may be used to control appointment-based physical interactions. For example, when required composite states associated with registration or eligibility become satisfied, the systems and methods herein may generate a machine-readable credential such as a QR code or barcode that is displayed on a user device. That credential may be scanned at a physical location, such as a service desk or checkpoint, causing a physical terminal to confirm the appointment and permit in-person service. The interaction between the generated visualization and the scanning hardware represents a physical-world action tied directly to the classified user state.

In some embodiments, completion-state transitions may control activation of financial or transactional systems that interact with physical infrastructure. For example, when composite states associated with account setup or authorization become satisfied, the systems and methods herein may transmit an activation signal to a transaction-processing controller that enables payment processing at point-of-sale terminals. Such activation may allow physical card readers, kiosks, or vending systems to accept transactions that were previously disabled.

In some embodiments, completion-state classification vectors may control operation of Internet-of-Things (IoT) or smart devices. For example, when a composite state associated with installation or setup becomes satisfied, the systems and methods herein may transmit an enablement command to an IoT hub or controller. The controller may then activate a physical sensor, alarm system, thermostat, lighting system, or industrial actuator. Such activation may cause measurable physical changes in an environment, including temperature adjustment, alarm arming, or equipment operation.

In some embodiments, completion-state signals may influence physical-world routing or staffing decisions. For example, when completion-state classification vectors indicate incomplete composite states requiring assistance, the systems and methods herein may route a physical phone call to a specialized call-center queue or display a tailored script on an agent workstation. Such routing may affect how physical headsets, terminals, and operator workstations are utilized in real time.

Each of the foregoing physical-world actions is enabled by the specific technical architecture described herein, including normalized user-state data structures, vectorized completion-state representations, and event-driven propagation of state transitions.

2.10 Receiving Encrypted User State Data

S210, which includes receiving encrypted user state data, may function to obtain or receive user state data from a plurality of heterogeneous data sources. User state data, as generally used herein, may comprise encrypted machine-readable data values corresponding to user-provided inputs, data obtained from one or more linked external accounts, or other user-related data generated by the heterogeneous data sources. Each heterogeneous data source may generate encrypted user state data independently of other heterogeneous data sources and may be associated with a different application, service, sequence of user interfaces, or linked external account.

Encrypted User-Entered Responses

In some embodiments, the encrypted user state data may include encrypted user-entered responses collected by the plurality of heterogeneous data sources. The encrypted user state data may store each user-entered response in a machine-readable response record data structure comprising a prompt text key-value pair (e.g., {prompt_text: "<prompt text>"), a response key-value pair (e.g., response_value: "<user-provided response>"), and a data source key-value pair (e.g., source_id: "<heterogeneous data source identifier>"}).

In the above non-limiting example, "prompt_text" may define a key of the prompt text key-value pair that identifies a category or type of prompt or inquiry presented to a user by a heterogeneous data source, and the value associated with the "prompt_text" key (e.g., "<prompt text>") may represent textual or symbolic content corresponding to the prompt or inquiry. The "response_value" may define a key of the response key-value pair that identifies a user response field, and the value associated with the "response_value" key (e.g., "<user-provided response>") may represent user-provided input corresponding to the prompt or inquiry. The "source_id" may define a key of the data source key-value pair that identifies an originating heterogeneous data source, and the value associated with the "source_id" key (e.g., "<heterogeneous data source identifier>") may represent an identifier corresponding to an application, service, or user interface screen from which the user-entered response originated.

In some embodiments, the plurality of heterogeneous data sources may display a distinct sequence or series of event-driven user interfaces to collect the user-entered responses. A respective user interface screen of the event-driven user interfaces may include a prompt or inquiry presented to a user and one or more interaction elements configured to receive user input in response to the prompt or inquiry (e.g., text input fields, selectable options, toggles, sliders, or other input controls). Upon receiving a user response to the prompt, via the one or more interaction elements, S210 may generate a corresponding machine-readable response data structure, as described above.

For example, if a user answer (e.g., "Answer A") to a respective prompt (e.g., Prompt A) was collected by a first user interface element (e.g., slider A) displayed at a first user interface screen (e.g., User Interface Screen A) of heterogeneous data source A, the respective machine-readable response data structure generated by heterogeneous data source A may be {prompt_text: "Prompt A", response_value: "Answer A", source_id: "Slider A-User Interface Screen A-Heterogeneous Data Source A"}. A respective prompt or inquiry, as generally used herein, may refer to textual content presented to a user that specifies a question, instruction, or request for information to which the user provides a response. A user answer, sometimes referred to as a user-entered answer, may refer to textual, numeric, or selectable input provided by a user in response to the prompt or inquiry.

In some embodiments, upon detecting a user response to a respective prompt inputted at a graphical user interface screen, S210 may determine whether the user response corresponds to a state-related data element that is associated with a composite user state formed from a subset of user-entered responses. If S210 determines that the user response corresponds to a state-related data element, S210 may cause a respective heterogenous data source to present or display a subsequent graphical user interface screen configured to collect an additional user-entered response corresponding to a remaining state-related data element of the composite user state. The subsequent graphical user interface screen may have similar properties or characteristics as a previously presented graphical user interface screen. A number of subsequent graphical user interface screens that a respective heterogenous data source displays may be based on a quantity of remaining state-related data elements associated with the composite user state and may continue until the composite user state is determined to be complete.

In some embodiments, one or more of the graphical user interface screens may present a visual completion indicator (e.g., progress bar or the like) that reflects a proportion of collected state-related data elements relative to a total number of state-related data elements associated with the composite user state. For instance, in a non-limiting example, if the composite user state includes twenty state-related data elements and ten corresponding user-entered responses have been collected, the visual completion indicator may be rendered to indicate approximately fifty percent completion. As additional user-entered responses corresponding to the remaining state-related data elements are collected, the visual competition indicator may be updated accordingly until the composite user state is determined to be complete.

In some embodiments, one or more fields of the machine-readable response record data structure may be encrypted at or near a time of generation. For example, upon receiving a user-entered response via a respective interaction element, S210 may encrypt the response value prior to storing the response value as part of the response key-value pair in the machine-readable response record data structure. Additionally, or alternatively, the prompt text value, the data source identifier value, or both, may be encrypted prior to storage or transmission. Non-limiting examples of encryption algorithms used by S210 may include, but should not be limited to, symmetric encryption algorithms, asymmetric encryption algorithms, hybrid encryption schemes, or other cryptographic techniques suitable for protecting machine-readable data values in transit and at rest.

Encrypted External Account Data

In some embodiments, the encrypted user state data received by S210 may include encrypted account data obtained from one or more linked external accounts. The encrypted account data may comprise machine-readable data values retrieved from a respective linked external account via one or more authorized application programming interfaces (APIs), data feeds, or account access mechanisms, and may represent account attributes, activity records, status indicators, or other account-derived information associated with a user.

In some embodiments, an external account may become linked at S210 in response to receiving authorization credentials, access tokens, or consent signals provided by the user through a respective heterogenous data source. Upon successful linkage, S210 may retrieve encrypted account data associated with the user from the linked external account on an initial basis, and in some embodiments, on a periodic or event-driven basis thereafter.

In some embodiments, the encrypted account data retrieved from the one or more linked external accounts may be in a plurality of different data formats and/or may comprise different sets of attributes. For example, a first linked external account may provide encrypted account data in a structured record format comprising a predefined set of attribute fields, while a second linked external account may provide encrypted account data in a semi-structured or hierarchical format comprising nested records, variable-length attribute lists, or dynamically defined key-value pairs. Additionally, the types, names, and semantic meanings of the attributes included in the encrypted account data may vary across external accounts, such that potentially similar user-related information is represented using different attribute identifiers, data types, or value encodings.

2.20 Generating a Normalized User-State Data Structure

S220, which includes generating a normalized user-state data structure, may function to generate the normalized user-state data structure based on the encrypted user state data. A normalized user-state data structure, as generally used herein, may refer to a machine-readable data structure that stores user-related data values in a unified schema such that user state data originating from the plurality of heterogeneous data sources is represented using a uniform (e.g., same) set of attribute identifiers, data types, and structural relationships.

Decrypting the Encrypted User State Data

Figure 3:
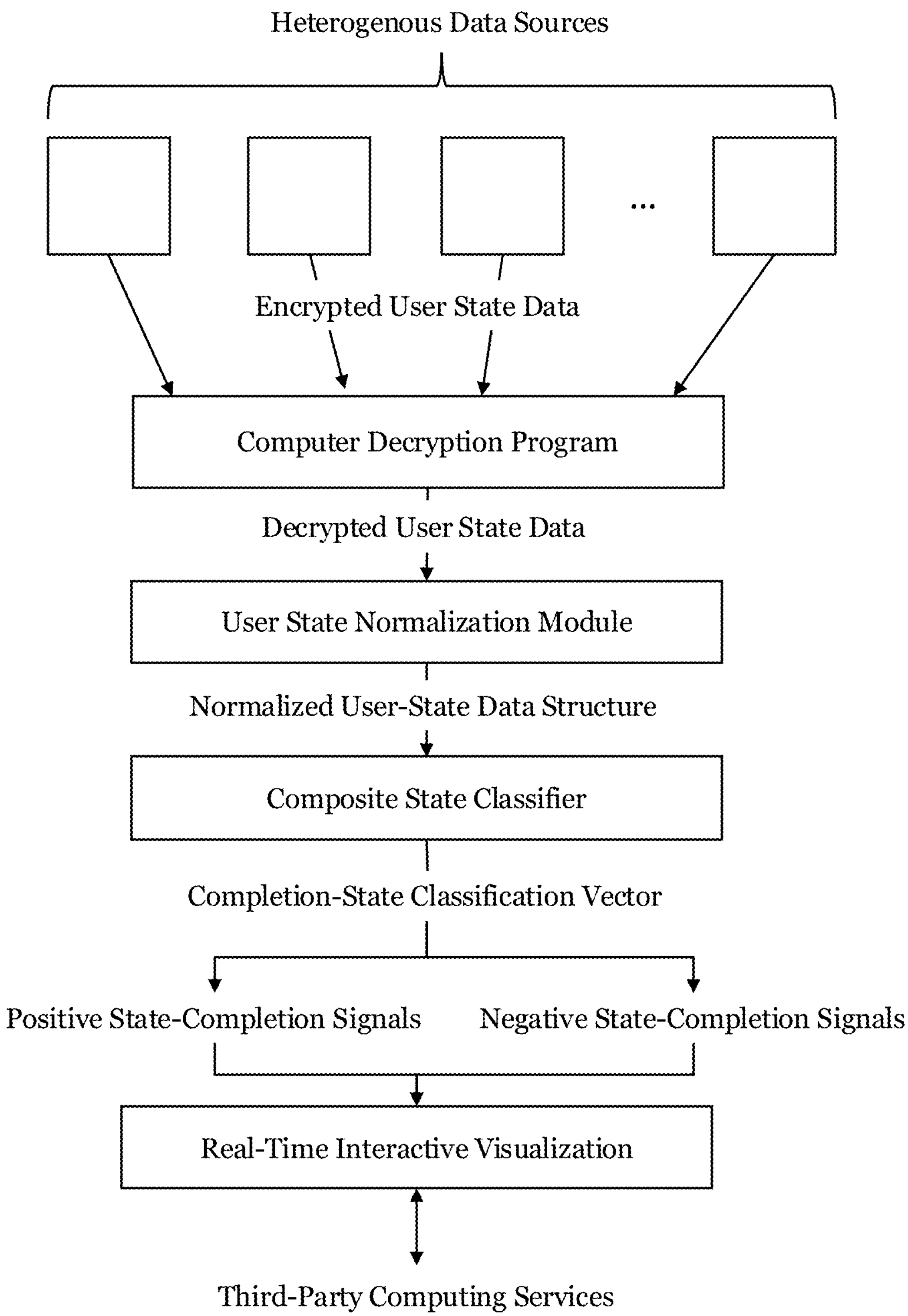
FIG. 3 illustrates a schematic representation for automatically classifying distributed user state data across a plurality of heterogeneous data sources in accordance with one or more embodiments of the present application.

In some embodiments, as generally illustrated in FIG. 3, generating the normalized user-state data structure may include decrypting the encrypted user state data into decrypted user state data. S220, in some embodiments, may use a computer decryption program to decrypt the encrypted user state data. The computer decryption program may include executable instructions for performing symmetric decryption, asymmetric decryption, hybrid decryption, or other cryptographic decoding operations using one or more cryptographic keys, key pairs, or secure key references associated with the encrypted user state data.

In some embodiments, the computer decryption program may receive an input comprising one or more respective machine-readable response record data structures. In response to receiving the input, the computer decryption program may identify one or more encrypted fields within each machine-readable response record data structure and apply a corresponding decryption operation to the identified encrypted fields to generate one or more decrypted field values. For example, as input, the computer decryption program may receive the following encrypted machine-readable response record data structure: {prompt_text: "[Encrypted Prompt Value]", response_value: "[Encrypted User Response]", source_id: "[Encrypted Source]"}.

In response to the computer decryption program identifying that the values of the "prompt_text," "response_value", and "source_id" fields are encrypted, the computer decryption program may apply one or more corresponding decryption operations to each of the encrypted fields to generate decrypted field values. Additionally, the computer decryption program may construct a decrypted machine-readable response record data structure in which the encrypted field values are replaced with the decrypted field values (e.g., {prompt_text: "Prompt A", response_value: "Answer A", source_id: "Slider A-User Interface Screen A-Heterogeneous Data Source A"}).

It shall be noted that, in some embodiments, S220 may selectively decrypt one or more fields of the machine-readable response record data structure(s) while leaving other fields encrypted, such that only data values required for generating the normalized user-state data structure are exposed in decrypted form.

Transforming the Decrypted User State Data

Additionally, in some embodiments, S220 may transform the decrypted user state data into a normalized user-state data structure. The normalized user-state data structure, in some embodiments, may comprise a user table and one or more composite state tables. The user table may comprise a plurality of user rows that each correspond to a unique user. Additionally, each user row of the user table may include a unique user identifier of the unique user and one or more composite state reference fields.

For instance, in a non-limiting example, a user row corresponding to User A may include a unique user identifier (e.g., user_id=UA123) and a plurality of composite state reference fields (e.g., state_ref_A, state_ref_B, . . . , state_ref_N), where each composite state reference field stores a reference value (e.g., a row identifier, pointer, or index) that links User A to a corresponding composite state row in a respective composite state table. A user row corresponding to User B may include the same set of composite state reference fields (e.g., state_ref_A, state_ref_B, . . . , state_ref_N), but the reference values stored in the composite state reference fields may point to different composite state rows associated with User B.

Each of the one or more composite state reference fields may store machine-readable reference values that associate the user row with a corresponding composite user state record maintained in the one or more composite state tables of the normalized user-state data structure. Additionally, or alternatively, each of the one or more composite state reference fields may store, for example, a row identifier, pointer, index value, or other reference indicator. For example, a first composite state reference field of a user row may store a row reference pointer that stores an address of a corresponding user state row in a first composite state table (e.g., composite table A). Similarly, a second composite state reference field of a user row may store a row reference pointer that stores an address of a corresponding user state row in a second composite state table (e.g., composite table B).

In some embodiments, the one or more composite state tables of the normalized user-state data structure may each correspond to a different composite user state collected by the plurality of heterogeneous data sources. For instance, in a non-limiting example, a first composite state table may correspond to Composite State A associated with heterogeneous data source A, and a second composite state table may correspond to Composite State B associated with heterogeneous data source B. As generally used herein, a composite user state may refer to a machine-determined representation of a user that is defined by a set of state-related data elements collected across one or more interactions, events, or interface presentations of a heterogenous data source. A composite user state may be formed by aggregating multiple user-entered responses, interaction outcomes, or account-derived data values that, collectively, represent whether a user has satisfied, progressed through, or otherwise engaged with a defined set of conditions or tasks associated with the heterogeneous data source.

In some embodiments, each composite state table may comprise a plurality of columns. Each column of a respective composite state table may correspond to a state-related data element associated with the composite user state for that user. For instance, in a non-limiting example, composite state A (e.g., a first composite state) may be associated with a first plurality of state-related data elements A-Z, and composite state B (e.g., a second composite state) may be associated with a second plurality of state-related data elements AA-ZZ. Thus, each column in a first composite state table corresponding to composite state A may correspond to distinct state-related data element of the first plurality of state-related data elements A-Z, and each column of a second composite state table corresponding to composite state B may correspond to distinct state-related data element of the first plurality of state-related data elements AA-ZZ.

A state-related data element, as generally used herein, may refer to a machine-readable data field that captures a specific user response, answer, interaction, outcome, account-derived attribute, or other discrete data value associated with the composite user state. Moreover, each composite state table may comprise a plurality of composite state rows that each correspond to a distinct user and stores state-related data element values for the composite user state associated with that user.

For example, a composite state row corresponding to user A in a composite state table for composite state A may store values for each of the state-related data elements A-Z defining composite state A, where each value reflects a user-entered response, interaction outcome, or account-derived attribute associated with user A. A composite state row corresponding to User B in the same composite state table may store values for the same set of state-related data elements A-Z, but with different values reflecting the responses, interactions, or attributes associated with user B.

Similarly, a composite state row corresponding to user A in a composite state table for composite state B may store values for a different set of state-related data elements AA-ZZ that define composite state B, and a composite state row corresponding to user B in the composite state table for composite state B may store corresponding values for the same set of state-related data elements AA-ZZ based on the data associated with user B.

In some embodiments, the reference values stored in the composite state reference fields of the user table (e.g., row identifiers, pointers, or index values) may be used by S220 to directly locate and retrieve the corresponding composite state rows from the composite state tables. In this manner, S220 may efficiently collect, join, or aggregate state-related data element values (or columns) across multiple composite state tables for a given user by following the reference values stored in the user row, without requiring a full scan of the composite state tables.

Extracting a Corpus of Raw User State Features

In some embodiments, transforming the decrypted user state data into the normalized user-state data structure may include extracting a corpus of raw user state features from the decrypted user state data. S220, in some embodiments, may use a feature extractor to extract the corpus of raw user state features from the decrypted user state data. A feature extractor, as generally used herein, may refer to a computer program configured to identify, isolate, and output machine-readable data values that are candidates for inclusion in the normalized user-state data structure.

In some embodiments, the feature extractor may receive the decrypted user state data as input. As mentioned previously, in some embodiments, the decrypted user state data may include decrypted account data obtained via one or more linked external accounts. The decrypted account data may be received in unstructured or semi-structured formats that differ across providers of the one or more linked external accounts and may include nested records, free-text fields, variable-length attributes, or provider-specific schemas.

In some embodiments, in response to receiving the decrypted user state data as input, the feature extractor may execute one or more feature extraction rules to extract a corpus of raw user state features from the decrypted user state data. The one or more feature extraction rules may include, for example, pattern-matching operations, regular expressions, key-based lookup machine learning classification models, natural language processing models, or combinations thereof. The feature extractor, in some embodiments, may apply different feature identification techniques to different portions of the decrypted user state data based on a detected data format, schema, data source identifier, or content type.

In some embodiments, when the decrypted user state data includes one or more machine-readable response record data structures (e.g., {prompt_text: " . . . ", response_value: " . . . ", source_id: " . . . "}), the feature extractor may apply a key-based lookup operation to identify one or more target field keys and extract corresponding field values as raw user state features. For instance, the feature extractor may search for the "prompt_text," "response_value," "source_id" keys in each respective response record data structure and extract the value associated with the "prompt_text," "response_value," and "source_id" keys as a raw user state feature.

Additionally, in some embodiments, when the decrypted user state data includes decrypted account data received in an unstructured or semi-structured format, the feature extractor may apply one or more pattern-matching operations or regular expressions to the decrypted account data to identify candidate raw user state features that are not explicitly labeled by field keys. For instance, the feature extractor may apply a first regular expression configured to identify a timestamp or date token in a provider-specific activity record and extract the identified token as a raw user state feature, and may apply a second regular expression configured to identify a numeric quantity or value embedded in a free-text account field and extract the numeric quantity or value as an additional raw user state feature.

Converting the Corpus of Raw User State Features into Normalized User State Features In some embodiments, generating the normalized user-state data structure may include converting the corpus of raw user state features into normalized user state features associated with the normalized user-state data structure. For example, as described herein, the normalized user-state data structure may include a user table and one or more composite state tables. Each composite state table may include a distinct, fixed set of state-related data elements as columns in a respective composite state table.

The fixed set of state-related data elements in a respective composite table may be formed from the raw user state features extracted from the decrypted user state data. In particular, the raw user state features originating from the plurality of heterogeneous data sources may use different feature names, labels, or identifiers than the state-related data elements defined as columns of the composite state tables. For example, a raw user state feature extracted from a first heterogeneous data source may be identified by a feature name such as "status_response" while a corresponding state-related data element of a composite state table may be identified by a normalized column name such as "status_complete." In many embodiments, thousands or millions of raw user state features may be extracted across the plurality of heterogeneous data sources, which gives rise to a correspondingly large number of naming divergences.

Constructing a Machine-Readable Classification Prompt

In some embodiments, S220 may construct a machine-readable classification prompt to map (e.g., convert) the corpus of raw user state features to the normalized state features. To construct the machine-readable classification prompt, S220 may begin by extracting the state-related data elements defined as columns in each of the one or more composite state tables of the normalized user-state data structure. After extracting the state-related data elements, S220 may then generate and add a normalization schema to the machine-readable classification prompt.

In some embodiments, the normalization schema may specify how the corpus of raw user state features is to be mapped to the normalized state features. For instance, in a non-limiting example, the normalization schema may define a tabular mapping data structure having a first column that lists a plurality of raw input feature identifiers (e.g., names) corresponding to the corpus of raw user state features and/or a second column that lists a plurality of normalized feature identifiers corresponding to the state-related data elements of the normalized user-state data structure.

Additionally, or alternatively, S220 may insert a required output structure into the machine-readable classification prompt. The required output structure may define a set of parameterized schema elements corresponding to the plurality of normalized feature identifiers. Each parameterized schema element may comprise a respective normalized feature identifier field that uniquely identifies a normalized user state feature and a placeholder parameter filed that prompts (e.g., instructs) the large language model to replace the text of the placeholder parameter with a raw input feature identifier of the plurality of raw input feature identifiers.

For instance, in a non-limiting example, the required output structure inserted into the required output structure may be expressed in a structured data format (e.g., JSON format), such as: {"normalized_feature_mappings": [{"normalized_feature_identifier": "status_complete", "raw_input_feature_identifier": "<PLACEHOLDER>"}, {"normalized_feature_identifier": "identity_verified", "raw_input_feature_identifier": "<PLACEHOLDER>"}, {"normalized_feature_identifier": "account_linked", "raw_input_feature_identifier": "<PLACEHOLDER>"}]}.

In the above non-limiting example, each object within the "normalized_feature_mappings" array may represent a parameterized schema element associated with a distinct normalized user state feature. The "normalized_feature_identifier" field specifies the target normalized feature (e.g., a column of a composite state table within the normalized user-state data structure), while the corresponding "raw_input_feature_identifier" field initially includes placeholder text indicating that a value is to be supplied by the large language model. During execution of the machine-readable classification prompt, the large language model may assess the corpus of raw user state features and replace the placeholder text with a raw input feature identifier that it determines semantically corresponds to the associated normalized feature identifier. In this way, the required output structure constrains the large language model to produce a deterministic, machine-readable mapping output that can be programmatically consumed to populate the normalized user-state data structure.

In some embodiments, after constructing the machine-readable classification prompt, S220 may input the machine-readable classification prompt to a large language model. The large language model may be executed locally, remotely, or via a network-accessible inference service. Upon receiving the machine-readable classification prompt as input, the large language model may execute the machine-readable classification prompt.

In response to executing the machine-readable classification prompt, the large language model may generate and return a machine-readable output that maps each raw user state feature in the corpus of raw user state features to a respective normalized user state feature of the normalized user state features. In particular, for each parameterized schema element of the required output structure, the large language model may replace text associated with the placeholder parameter (e.g., "<PLACEHOLDER>") with a raw input feature identifier selected from the corpus of raw user state features that the large language model determines corresponds to the associated normalized feature identifier. The resulting machine-readable output may therefore define an explicit, programmatically consumable mapping between heterogeneous raw feature identifiers and the normalized state-related data elements of the normalized user-state data structure.

In some embodiments, the machine-readable output generated by the large language model may include one or more parameterized schema elements in which the placeholder parameter remains unreplaced. Such a condition may occur, for example, when the large language model determines that no raw user state feature in the corpus of raw user state features sufficiently corresponds to a particular normalized feature identifier, or when the relevant raw user state feature is absent from the decrypted user state data.

In response to detecting that the text of a placeholder parameter has not been replaced with a raw input feature identifier, S220 may insert, in place of the placeholder parameter, a null identifier corresponding to the respective normalized feature identifier. The null identifier may indicate that no raw user state feature is currently available for the normalized feature and may be stored as a null value, empty value, sentinel value, or other machine-readable indicator of missing data within the normalized user-state data structure.

Embedding the Normalized User State Features into the Normalized User-State Data Structure In some embodiments, after converting the corpus of raw user state features into normalized user state features, S220 may embed the normalized user state features into the normalized user-state data structure. Embedding, as generally used herein, may refer to inserting, updating, or otherwise persisting normalized feature values into one or more machine-readable tables of the normalized user-state data structure in a manner that preserves relational associations between users and composite user states.

In some embodiments, embedding the normalized user state features may include creating or updating one or more composite state rows within the one or more composite state tables. For each given normalized user state feature corresponding to a state-related data element (e.g., a normalized feature identifier such as "status_complete"), S220 may determine the composite state table in which the state-related data element is defined as a column. S220 may then write a value for the normalized user state feature into the column corresponding to the state-related data element for a row associated with the user.

For example, in a non-limiting embodiment, composite state table A may include columns corresponding to normalized state-related data elements A-Z. If a normalized user state feature indicates that that a raw user state feature collected for user A correspond to state-related data element "A," S220 may populate the column corresponding to state-related data element "A" in the composite state row associated with User A with the value collected by the heterogeneous data source (e.g., a user-entered response value, account-derived attribute, categorical label, timestamp, or other machine-readable data value). If no composite state row yet exists for user A in composite state table A, S220 may create a new composite state row for user A and populate the appropriate columns with collected values as additional normalized user state features become available.

In another non-limiting embodiment, composite state table B may include columns corresponding to a different set of normalized state-related data elements AA-ZZ. If a normalized user state feature indicates that a raw user state feature collected for user A corresponds to state-related data element "BB" of composite state table B, S220 may populate the column corresponding to state-related data element "BB" in the composite state row associated with user A with the value collected by the heterogeneous data source (e.g., a user-entered response value, account-derived attribute, categorical label, timestamp, or other machine-readable data value). If no composite state row yet exists for user A in composite state table B, S220 may create a new composite state row for user A and populate the appropriate columns with collected values as additional normalized user state features associated with composite state table B become available.

In some embodiments, embedding the normalized user state features may further include updating the user table to maintain referential links between user rows and composite state rows. For instance, upon creating or identifying a composite state row for user A in composite state table A, S220 may store a reference to that composite state row (e.g., a row identifier, pointer, or index value) in a corresponding composite state reference field (e.g., state_ref_A) of the user row associated with user A in the user table. Such reference may enable efficient retrieval of the composite user state for user A without duplicating state-related data across tables.

By way of further example, a user row corresponding to user A may include a unique user identifier (e.g., user_id=UA123) and composite state reference fields such as state_ref_A and state_ref_B. The value stored in state_ref_A may reference a row in composite state table A that stores normalized state-related data elements for composite state A, while the value stored in state_ref_B may reference a different row in composite state table B that stores normalized state-related data elements for composite State B. As additional normalized user state features are generated (e.g., goals, state-dependent tasks, etc.), S220 may update the referenced composite state rows by embedding additional normalized feature values into the appropriate columns.

As described in greater detail herein, in some embodiments, the embedding process of S220 may occur incrementally over time. That is, as new normalized user state features are generated from newly received user state data, S220 may update existing composite state rows by populating previously null columns, overwrite existing values when updated information is received, or append new composite state rows if a new composite user state is detected.

2.30 Generating a Completion-State Classification Vector

S230, which includes generating a completion-state classification vector, may function to generate the completion-state classification vector based on the normalized user-state data structure. A completion-state classification vector, as generally used herein, may be implemented as a contiguous memory structure (e.g., an array, list, vector, etc.) comprising a plurality of indices addressable in memory. Each index of the plurality of indices may correspond to a distinct composite state (e.g., state-dependent task) associated with the normalized user-state data structure.

For instance, in a non-limiting example, the normalized user-state structure may include a plurality of composite state tables (e.g., twenty composite state tables) corresponding to a plurality of composite states (e.g., twenty composite states (also referred to as "state-dependent tasks")). Thus, in some embodiments, the completion-state classification vector may include a total number of index positions (e.g., twenty index positions) corresponding to the plurality of composite states (e.g., twenty composite states). It shall be noted that the above example is not intended to be limiting and that the completion-state classification vector may comprise additional, fewer, or different index positions without departing from the scope of the disclosure.

In some embodiments, each index position of the completion-state classification vector may be associated with a corresponding composite state of the plurality of composite states. For instance, in a non-limiting example, a first index position of the completion-state classification vector may correspond to a first composite state (e.g., composite state A), a second index position may correspond to a second composite state (e.g., composite state B), a third index position may correspond to a third composite state, and so forth, such that each composite state has a designated index position within the completion-state classification vector. It shall be noted that such index-to-state correspondence may be predefined, dynamically assigned, or derived from an ordering of the composite state tables in the normalized user-state data structure.

Embedding Binary State-Bit Values into the Completion-State Classification Vector In some embodiments, generating the completion-state classification vector may include embedding a binary state-bit value into each respective index position of the completion-state classification vector. Embedding a binary state-bit value (e.g., completion state classification value) into a respective index position of the completion-state classification vector may include extracting a plurality of user state columns mapped to a composite state (e.g., state-dependent task) associated with the respective index position. For instance, in a non-limiting example, a first index position of the completion-state classification vector may correspond to a first composite state associated with the normalized user-state data structure. In response to identifying the first index position of the completion-state classification vector, S230 may extract, from the normalized-user state data structure, a plurality of state columns corresponding (e.g., mapped) to the first composite state. It shall be noted that the plurality of state columns corresponding to the first composite state may be defined as the columns in a composite state table associated with the first composite state.

After extracting the plurality of state columns corresponding to the first composite state, S230 may assess the plurality of state columns to determine whether each of the plurality of state columns comprises a non-null value. If S230 determines that each of the plurality of state columns comprises a non-null value (e.g., pre-defined state-completion criteria), S230 may generate a first binary state-bit value (e.g., "1") encoded to indicate that the first composite state satisfies pre-defined state-completion criteria and may embed the first binary state-bit value at a first index position of the competition-state classification vector corresponding to the first composite state. Conversely, if S230 determines that at least one of the plurality of state columns comprises a null value, S230 may generate a second binary state-bit value (e.g., "0") encoded to indicate that the first composite state does not satisfy the pre-defined state-completion criteria, and may embed the second binary state-bit value at the first index position of the completion-state classification vector.

S230 may perform analogous operations for each remaining index position of the completion-state classification vector. For example, a second index position of the completion-state classification vector may correspond to a second composite state associated with the normalized user-state data structure. In response to identifying the second index position, S230 may extract a second plurality of state columns mapped to the second composite state (e.g., the columns in a composite state table associated with the second composite state) and assess the second plurality of state columns to determine whether each of the second plurality of state columns comprises a non-null value.

If S230 determines that each of the second plurality of state columns comprises a non-null value (e.g., pre-defined state-completion criteria), S230 may generate the first binary state-bit value (e.g., "1") encoded to indicate that the second composite state satisfies the pre-defined state-completion criteria and may embed the first binary state-bit value at the second index position of the completion-state classification vector corresponding to the second composite state. Conversely, if S230 determines that at least one of the second plurality of state columns comprises a null value, S230 may generate the second binary state-bit value (e.g., "0") encoded to indicate that the second composite state does not satisfy the pre-defined state-completion criteria and may embed the second binary state-bit value at the second index position of the completion-state classification vector.

Generating Positive State-Completion Signals

In some embodiments, S230 may generate one or more positive state-completion signals in response to generating the completion-state classification vector. A respective positive state-completion signal may be generated for each index position of the completion-state classification vector that includes a binary state-bit value (e.g., completion state classification value) encoded to indicate that a corresponding composite state satisfies the pre-defined state-completion criteria.

For instance, in a non-limiting example, S230 may detect that a first and/or a second index position of the completion-state classification vector includes a binary state-bit value encoded to indicate satisfaction of the pre-defined state-completion criteria (e.g., a value of "1"). In response to detecting that the binary state-bit value of the first and/or the second index position satisfies the pre-defined state-completion criteria, S230 may generate a positive-state completion signal for the first index portion and/or a positive-state completion signal for the second index position. It shall be noted that the above example is not intended to be limiting and that S230 may generate additional, different, or fewer positive state-completion signals when S230 detects that additional, different, or fewer binary state-bit values in the completion-state classification vector satisfies the pre-defined state completion criteria.

In some embodiments, each of the one or more positive state-completion signals may include or correspond to a real-time broadcast message. A real-time broadcast message generated by S230 may include a key-value payload comprising one or more key-value pairs. A first key-value pair included in the key-value payload may include a state-dependent task key (e.g., composite state key) and a value of the state-dependent task (e.g., composite state value). For instance, in a non-limiting example, a real-time broadcast message generated in response to detecting that a first index position of the completion-state classification vector satisfies the pre-defined state completion criteria may specify the value of the state-dependent task key as a first composite state identifier (e.g., composite state A) corresponding to the first index position of the completion-state classification vector (e.g., {state_task: "Composite State A"}).

In yet another non-limiting example, a real-time broadcast message generated in response to detecting that a second index position of the completion-state classification vector satisfies the pre-defined state completion criteria may specify the value of the state-dependent task key as a second composite state identifier (e.g., composite state B) corresponding to the second index position of the completion-state classification vector (e.g., {state_task: "Composite State B"}).

Moreover, in some embodiments, the key-value payload of a respective real-time broadcast message may include a second key-value pair. The second key-value pair may include a completion state classification value key and a value corresponding to the binary state-bit value embedded at the index position of the completion-state classification vector associated with the real-time broadcast message. The value of the completion state classification value key may therefore explicitly indicate whether the corresponding composite state satisfies or does not satisfy the pre-defined state-completion criteria.

For instance, in a non-limiting example, when a real-time broadcast message is generated for a composite state that satisfies the pre-defined state-completion criteria, the completion state classification value key may be assigned a value of "1." Conversely, when the real-time broadcast message is generated for a composite state that does not satisfy the pre-defined state-completion criteria, the completion state classification value key may be assigned a value of "0" (e.g., {classification_value: "0"}).

Generating Negative State-Completion Signals

In some embodiments, S230 may generate one or more negative state-completion signals in response to generating the completion-state classification vector. A respective negative state-completion signal may be generated for each remaining index position of the completion-state classification vector that includes a binary state-bit value (e.g., completion state classification value) encoded to indicate that a corresponding composite state does not satisfy the pre-defined state-completion criteria.

For instance, in a non-limiting example, S230 may detect that a first and/or a second index position of the completion-state classification vector includes a binary state-bit value encoded to indicate failure of the pre-defined state-completion criteria (e.g., a value of "0"). In response to detecting that the binary state-bit value of the first and/or the second index position does not satisfy the pre-defined state-completion criteria, S230 may generate a negative-state completion signal for the first index position and a negative-state completion signal for the second index position. It shall be noted that the above example is not intended to be limiting and that S230 may generate additional, different, or fewer negative state-completion signals when S230 detects that additional, different, or fewer binary state-bit values in the completion-state classification vector do not satisfy the pre-defined state completion criteria.

In some embodiments, each of the one or more negative state-completion signals may include or correspond to a real-time broadcast message. A real-time broadcast message generated by S230 may include a key-value payload comprising one or more key-value pairs. A first key-value pair included in the key-value payload may include a state-dependent task key (e.g., composite state key) and a value of the state-dependent task (e.g., composite state value). For instance, in a non-limiting example, a real-time broadcast message generated in response to detecting that a first index position of the completion-state classification vector does not satisfy the pre-defined state completion criteria may specify the value of the state-dependent task key as a first composite state identifier (e.g., composite state A) corresponding to the first index position of the completion-state classification vector (e.g., {state_task: "Composite State A"}).

In yet another non-limiting example, a real-time broadcast message generated in response to detecting that a second index position of the completion-state classification vector does not satisfy the pre-defined state completion criteria may specify the value of the state-dependent task key as a second composite state identifier (e.g., composite state B) corresponding to the second index position of the completion-state classification vector (e.g., {state_task: "Composite State B"}).

Moreover, in some embodiments, the key-value payload of a respective real-time broadcast message may include a second key-value pair. The second key-value pair may include a completion state classification value key and a value corresponding to the binary state-bit value embedded at the index position of the completion-state classification vector associated with the real-time broadcast message. The value of the completion state classification value key may therefore explicitly indicate whether the corresponding composite state satisfies or does not satisfy the pre-defined state-completion criteria.

For instance, in a non-limiting example, when a real-time broadcast message is generated for a composite state that does not satisfy the pre-defined state-completion criteria, the completion state classification value key may be assigned a value of "1" (e.g., {classification_value: "1"}). Conversely, when the real-time broadcast message is generated for a composite state that does not satisfy the pre-defined state-completion criteria, the completion state classification value key may be assigned a value of "0."

Generating a Real-Time Interactive Visualization

In some embodiments, S230 may generate a real-time interactive visualization based on the completion-state classification vector and the one or more positive and negative state-completion classification signals. The real-time interactive visualization may be configured to visually encode, in real time, the binary state-bit values the plurality of embedded at the plurality of index positions of the completion-state classification vector.

In some embodiments, the real-time interactive visualization may comprise an interactive, segmented graphical visualization having a plurality of interactive visual portions. Each interactive visual portion of the interactive, segmented graphical visualization may be defined as a bounded graphical region within a composite graphical object (e.g., an angular sector of a radial visualization, a bounded polygonal segment, or another discrete renderable region generated by a graphical rendering engine). A total number of interactive visual portions of the interactive, segmented graphical visualization may correspond to (e.g., be equivalent to) the total number of index positions in the completion state classification vector.

For example, in a non-limiting embodiment in which the completion-state classification vector comprises eight index positions, the interactive, segmented graphical visualization may comprise (e.g., create) eight bounded visual portions arranged circumferentially around a central point to form a radial visualization. In yet another non-limiting example, if the completion-state classification vector comprises twelve index positions, the interactive visualization may comprise (e.g., create) twelve bounded visual portions arranged in a circular, linear, or tiled configuration, with each bounded visual portion representing a distinct index position and its associated composite state.

In some embodiments, each visual portion of the segmented graphical visualization may be rendered with one or more visual attributes that are determined based on the binary state-bit value embedded at the corresponding index position of the completion-state classification vector. The one or more visual attributes may include, for example, a chromatic intensity, a fill color, a border style, an icon overlay, a texture pattern, or a combination thereof.

For instance, in a non-limiting example, if a visual portion of the segmented graphical visualization corresponds to an index position of the completion-state classification vector that stores a binary state-bit value encoded to indicate satisfaction of the pre-defined state-completion criteria (e.g., a value of "1"), S230 or a primary user interface controller node may render the visual portion with a first chromatic intensity (e.g., a saturated or high-contrast color), a completion-indicative icon, or another visually distinguishable representation. Conversely, if a visual portion of the segmented graphical visualization corresponds to an index position that stores a binary state-bit value encoded to indicate non-satisfaction of the pre-defined state-completion criteria (e.g., a value of "0"), the visual portion may be rendered with a second chromatic intensity (e.g., a muted or low-contrast color), an alternate icon, or an absence of the completion-indicative icon.

Additionally, or alternatively, in some embodiments, one or more interactive visual portions of the interactive, segmented graphical visualization may be created, updated, or modified in response to receiving a real-time broadcast message corresponding to a respective index position of the completion-state classification vector. In such embodiments, S230 or a primary user interface controller node may use a key-value payload of the real-time broadcast message to identify the visual portion mapped to the respective index position and to determine how the visual portion should be rendered or updated.

For instance, in a non-limiting example, upon receiving a first real-time broadcast message corresponding to a first index position of the completion-state classification vector, the primary user interface controller node may determine, from a first key-value pair of the key-value payload, a state-dependent task value indicating that the first index position is associated with a first composite state (e.g., composite state A). If no visual portion corresponding to the first composite state has been created in the interactive, segmented graphical visualization, the primary user interface controller node may create a new interactive visual portion mapped to the first index position.

In some embodiments, after identifying or creating the interactive visual portion corresponding to the first composite state, the primary user interface controller node may determine how the visual portion is to be rendered based on a second key-value pair of the key-value payload comprising a completion state classification value key and a corresponding binary state-bit value. If the binary state-bit value is encoded to indicate satisfaction of the pre-defined state-completion criteria (e.g., a value of "1"), the primary user interface controller node may render the interactive visual portion using a first set of visual attributes, such as a first chromatic intensity, a saturated or high-contrast fill color, and/or a completion-indicative icon.

Conversely, if the binary state-bit value included in the completion state classification value key is encoded to indicate non-satisfaction of the pre-defined state-completion criteria (e.g., a value of "0"), the primary user interface controller node may render the interactive visual portion using a second, different set of visual attributes, such as a muted or low-contrast chromatic intensity, an alternate icon, a reduced opacity level, or an absence of the completion-indicative icon.

Alternatively, if a visual portion corresponding to the first composite state has already been created in the interactive, segmented graphical visualization, the primary user interface controller node may update or modify the existing visual portion in response to receiving a real-time broadcast message or an updated real-time broadcast message corresponding to the first index position of the completion-state classification vector. In such embodiments, the primary user interface controller node may refrain from (e.g., forgo) creating a new visual portion and instead dynamically update one or more visual attributes of the existing visual portion based on the key-value payload of the real-time broadcast message, including a completion state classification value key indicating an updated binary state-bit value.

For example, in a non-limiting embodiment, after a sequence of event-driven user interfaces generates updated encrypted user state data (e.g., goals, state-dependent tasks, etc.) for the first composite state, S230 may regenerate the completion-state classification vector and detect that the first index position has been updated from a first binary state-bit value encoded to indicate non-satisfaction of the pre-defined state-completion criteria (e.g., a value of "0") to a second binary state-bit value encoded to indicate satisfaction of the pre-defined state-completion criteria (e.g., a value of "1"). In response to detecting the update at the first index position, S230 may broadcast an update to the first real-time broadcast message that changes the value of the completion state classification value key from the first binary state-bit value to the second binary state-bit value.

In response to broadcasting the update to the first real-time broadcast message, the primary user interface controller node may dynamically change, in real time, the visual attributes of the existing interactive visual portion mapped to the first index position. For instance, the primary user interface controller node may transition the visual portion from a second chromatic intensity to a first chromatic intensity, enable or display a completion-indicative icon, adjust opacity or contrast parameters, or otherwise modify the visual task element to visually encode the updated binary state-bit value.

In some embodiments, updates to the interactive, segmented graphical visualization may be rendered using animated visual transitions to convey changes in completion state over time. For instance, when the primary user interface controller node receives an updated real-time broadcast message indicating that a binary state-bit value at a respective index position has transitioned from a first value (e.g., "0") to a second value (e.g., "1"), the primary user interface controller node may animate the corresponding visual portion from a first visual state to a second visual state rather than applying an instantaneous visual change.

In a non-limiting example, animating the visual transition may include gradually changing a chromatic intensity, color saturation, opacity level, border thickness, or icon visibility of the visual portion over a predefined animation interval. For example, a visual portion corresponding to a composite state that transitions from non-satisfied to satisfied may be animated from a muted or low-contrast color to a saturated or high-contrast color using a smooth interpolation function executed by a graphical rendering engine.

Additionally, or alternatively, animated transitions may include temporal effects such as fade-in effects, radial sweep animations, scaling effects, pulsing highlights, or icon morphing effects that visually emphasize the transition of the corresponding index position within the completion-state classification vector. In some embodiments, the animation parameters (e.g., duration, easing curve, delay, or sequencing order) may be dynamically selected based on the state-dependent task, the magnitude of state change, or a priority associated with the composite state.

In some embodiments, when multiple index positions of the completion-state classification vector are updated within a common time window, the primary user interface controller node may animate the corresponding visual portions sequentially or concurrently based on an ordering derived from the index positions, a predefined task hierarchy, or timestamps associated with the real-time broadcast messages.

Requesting Permission and Transmitting the Real-Time Interactive Visualization

In some embodiments, after generating the real-time interactive visualization of the completion-state classification vector and the one or more positive and negative state-impletion signals, S230 may request permission from an authorized user (e.g., associated with the encrypted user state data received in S210) to display the real-time interactive visualization on a device of the authorized user. The request for permission to display the interactive visualization may comprise an implicit permission request or an explicit permission request.

In some embodiments, an explicit permission request may include transmitting, by S230, an electronic communication (e.g., email, short message service (SMS) message, in-application notification, push notification, web-based notification, etc.) to the authorized user that presents a permission interface on the device of the authorized user. The permission interface may include a first graphical user interface element configured to grant permission to display the real-time interactive visualization and a second graphical user interface element configured to deny permission to display the real-time interactive visualization. In response to receiving a selection of the first graphical user interface element, S230 may determine that permission has been granted and may proceed with transmitting the real-time interactive visualization to the device of the authorized user. Conversely, in response to receiving a selection of the second graphical user interface element, S230 may determine that permission to display the real-time interactive visualization has been denied and may suppress transmission of the real-time interactive visualization to the device of the authorized user Additionally, or alternatively, in some embodiments, the request for permission may be implicit. In such embodiments, permission to display the real-time interactive visualization may be inferred based on one or more authorization conditions associated with the authorized user, including, but not limited to, a prior consent record, an authenticated session state, an account-level preference, a role-based access designation, an administrative privilege, or a previously installed and authenticated application environment. For example, if the authorized user has previously authorized display of completion-state information or has accepted terms permitting real-time visualization of user state data (e.g., goals, state-dependent tasks, etc.), S230 may determine that permission is already granted and may transmit the real-time interactive visualization without presenting an additional permission interface.

In response to determining that permission to display the real-time interactive visualization has been granted, whether explicitly or implicitly, S230 may automatically install, on the device of the authorized user, an application bundle configured to present the real-time interactive visualization. The application bundle may include executable instructions, user interface assets, and visualization logic required to render the completion-state classification vector and the one or more positive and negative state-completion signals. After automatically installing the application bundle on the device of the authorized user, S230 may automatically launch the application bundle and navigate the authorized user to a view that presents the real-time interactive visualization.

2.40 Providing Normalized User-State Data and Completion-State Data to Third-Party Computing Services S240, which may include automatically providing the normalized user-state data and/or completion-state data to one or more third-party computing services, may function to provide or propagate the normalized user-state data and/or completion-state data to one or more third-party computing services via a completion-state propagation index. A completion-state propagation index, as generally used herein, may refer to a machine-readable, tabular data structure maintained in computed memory that stores a plurality of index records. Each index record of the completion-state propagation index may be associated with a respective authorized user with one or more third-party computing services (e.g., distinct from the heterogeneous data sources described in S210).

For instance, in a non-limiting example, a first index record of the completion-state propagation index may correspond to an authorized user (e.g., User A) and may store a service identifier for a first third-party computing service (e.g., Third-Party Service X). The first index record, in some embodiments, may further store a machine-readable reference (e.g., reference pointer, or the like) to the normalized user-state data structure generated for User A, the completion-state classification vector generated for User A, and the real-time interactive visualization associated with the completion-state classification vector for User A. Thus, in some embodiments, the first index record may define an explicit association between User A and Third-Party Service X for purposes of accessing completion-state and normalized user-state information.

In some embodiments, the completion-state propagation index may additionally include one or more index records corresponding to a different authorized user (e.g., User B). For example, a second index record may correspond to User B and may store a machine-readable reference to a normalized user-state data structure generated for User B, a completion-state classification vector generated for User B, and an associated real-time interactive visualization. In such embodiments, the second index record may initially omit any service identifier for a third-party computing service, thereby indicating that User B has not yet authorized or subscribed to any third-party computing services for access to completion-state or normalized user-state data.

Additionally, in some embodiments, a third index record of the completion-state propagation index may associate the same authorized user (e.g., User A) with a different third-party computing service (e.g., Third-Party Service Y). The third index record may reference the same completion-state classification vector and normalized user-state data structure as the first index record, or, in some embodiments, may reference a filtered, transformed, or access-scoped version thereof based on permissions, subscription parameters, or service-specific data-sharing policies.

In some embodiments, S240 may create, update, or remove index records in the completion-state propagation index in response to detecting a subscription event, authorization event, revocation event, or permission update associated with an authorized user. For example, upon detecting that an authorized user has subscribed to a third-party computing service, S240 may generate a new index record that associates the authorized user with the third-party computing service and stores machine-readable references linking the third-party computing service to the corresponding normalized user-state data structure, completion-state classification vector, and real-time interactive visualization.

Conversely, in response to detecting a revocation event, unsubscribe action, or permission downgrade associated with the authorized user and a respective third-party computing service, S240 may update or remove a corresponding index record from the completion-state propagation index. In such embodiments, updating or removing the index record may prevent the third-party computing service from accessing (e.g., newly) generated completion-state data, normalized user-state data, or real-time visualization updates associated with the authorized user, while preserving the underlying user-state data for other authorized services.

In some embodiments, S240 may further update existing index records in response to a permission update that modifies a scope of access granted to a third-party computing service. For example, a permission update may cause S240 to replace a reference to a full normalized user-state data structure with a reference to a filtered or access-scoped representation thereof, to update a reference to a completion-state classification vector with a reduced-dimension vector, or to disable propagation of the real-time interactive visualization while maintaining access to completion-state classification values.

In some embodiments, S240 may propagate changes to a completion-state classification vector to one or more third-party computing services in an event-driven manner. In such embodiments, S240 may monitor the completion-state classification vector for updates resulting from newly received encrypted user state data (e.g., goals, state-dependent tasks, etc.), updated normalized user-state data, or changes to one or more composite state rows.

In response to detecting that a completion-state classification vector associated with an authorized user has been updated, S240 may identify one or more index positions of the completion-state classification vector whose binary state-bit values have changed. For example, S240 may detect that a first index position corresponding to a first composite state has transitioned from a first binary state-bit value (e.g., "0") to a second binary state-bit value (e.g., "1") as a result of updated user-entered responses or account-derived data.

Upon detecting such a change, S240 may propagate the change to each third-party computing service associated with the completion-state classification vector via the completion-state propagation index. In some embodiments, propagating the change may include transmitting, to each associated third-party computing service, a lightweight update payload (e.g., message) comprising an index position identifier corresponding to the updated composite state and the updated binary state-bit value.

In some embodiments, S240 may provide different third-party computing services with different levels of access to the normalized user-state data structure, the completion-state classification vector, and/or the real-time interactive visualization. In some embodiments, a first subset of the third-party computing services may be granted full access to the normalized user-state data structure and the completion-state classification vectors for one or more authorized users. Full access, as generally used herein, may refer to access permissions enabling a third-party computing service to retrieve, query, and compute over substantially all user rows, composite state rows, and state-related data element values stored in the normalized user-state data structure, as well as substantially all index positions and binary state-bit values stored in the completion-state classification vectors.

By providing full access, S240 may enable a third-party computing service to execute one or more machine-driven operations over the normalized user-state data structure and/or the completion-state classification vectors, including, but not limited to, user segmentation operations, filtering operations, indexing operations, search operations, and aggregation operations. For example, a third-party computing service may execute a filtering operation to identify a subset of users whose completion-state classification vector includes a first set of index positions encoded with binary state-bit values indicating satisfaction of pre-defined state-completion criteria (e.g., "1") and a second set of index positions encoded with binary state-bit values indicating non-satisfaction of pre-defined state-completion criteria (e.g., "0"). Additionally, or alternatively, the third-party computing service may execute one or more queries over the normalized user-state data structure to identify users having particular combinations of normalized user attributes and state-related data element values. For instance, the third-party computing service may identify users whose normalized user attribute values satisfy specified attribute-level constraints (e.g., user_type="enterprise", region="EU", or account_tier="premium") and whose composite state tables include non-null values for selected state-related data elements (e.g., "identity_verified" and "account_linked") and a null value for another state-related data element (e.g., "status_complete").

In some embodiments, full-access third-party computing services may maintain one or more service-side indexes derived from the normalized user-state data structure to support fast retrieval of user cohorts. For example, a third-party computing service may build an inverted index, bitmap index, hash index, or columnar index keyed by normalized feature identifiers, composite state identifiers, or index position identifiers of the completion-state classification vector. Such service-side indexes may be updated in response to the delta propagation described herein.

It shall be noted that the above examples are not intended to be limiting and that third-party computing services granted full access may execute additional, different, or fewer machine-driven operations over the normalized user-state data structure and the completion-state classification vectors without departing from the scope of the disclosure.

In some embodiments, propagation of the normalized user-state data and/or completion-state data to third-party computing services may be performed using a push-based model, a pull-based model, or a hybrid thereof. In a push-based model, S240 may automatically transmit updates to one or more third-party computing services in response to detecting a change to the normalized user-state data structure or the completion-state classification vector, without requiring an explicit data request from the third-party computing service. In a pull-based model, a third-party computing service may retrieve the normalized user-state data, completion-state classification vector, or incremental updates thereto by issuing one or more requests (e.g., API calls, queries, or subscription reads) to S240, which may validate the request against the completion-state propagation index before returning the requested data.

Real-Time Third-Party Application Control Based on Completion-State Signals

In some embodiments, after automatically providing one or more third-party computing services with access to the completion-state classification vector generated for an authorized user, the real-time interactive visualization of the completion-state classification vector, and the normalized user-state data structure, S240 may control, enable, inhibit, or modify functionality of one or more third-party applications in real time based on completion-state signals derived from the completion-state classification vector. Such control may be performed dynamically while a third-party application is executing on a device of the authorized user and may be driven by positive and negative state-completion signals transmitted from the one or more processors to the third-party application.

In some embodiments, after access to the normalized user-state data structure and completion-state data has been provided to a third-party computing service, S250 may detect that a third-party application associated with the third-party computing service is open or active on a device of the authorized user. Detection of the third-party application may be performed by an application bundle executing on the device of the authorized user, by monitoring application lifecycle events, foreground or background execution states, inter-process communication signals, deep-link activations, or operating-system-level application state notifications.

In response to detecting that the third-party application is open or active, S250 may establish a bi-directional communication channel between the one or more processors executing method 200 (e.g., an application bundle of method 200) and the third-party application. The bi-directional communication channel may be established using, for example, a persistent network socket, a local inter-process communication interface, a secure application programming interface (API) session, a message bus, or another authenticated communication mechanism. Once established, the bi-directional communication channel may be used to transmit completion-state signals to the third-party application and to receive acknowledgments, state updates, or application-level events from the third-party application in real time.

In some embodiments, after establishing the bi-directional communication channel, S250 may automatically transmit one or more positive state-completion signals to the third-party application. Each positive state-completion signal may correspond to a respective composite state (e.g., state-dependent task) for which the completion-state classification vector encodes satisfaction of the pre-defined state-completion criteria. The positive state-completion signals may be transmitted as machine-readable messages that include, for example, a state-dependent task identifier and a binary state-bit value indicating completion.

In response to the third-party application receiving the one or more positive state-completion signals, the third-party application may automatically inhibit execution of one or more activated functions corresponding to the subset of state-dependent tasks that satisfy the pre-defined state-completion criteria. For example, if a positive state-completion signal indicates that a particular composite state associated with an onboarding task, verification task, or setup task has already been completed, the third-party application may disable, suppress, gray out, or otherwise prevent execution of a function that would redundantly prompt the authorized user to perform the completed task in the third-party application.

In some embodiments, after establishing the bi-directional communication channel, S250 may additionally, or alternatively, automatically transmit one or more negative state-completion signals to the third-party application. Each negative state-completion signal may correspond to a respective composite state (e.g., state-dependent task) for which the completion-state classification vector encodes non-satisfaction of the pre-defined state-completion criteria. The negative state-completion signals may be transmitted as machine-readable messages including, for example, a state-dependent task identifier and a binary state-bit value indicating non-completion.

In response to the third-party application receiving one or more negative state-completion signals, the third-party application may automatically surface one or more unused, optional, or available functions associated with composite states that have not yet satisfied the pre-defined state-completion criteria. In such embodiments, the negative state-completion signals may be used to identify unmet conditions, incomplete state progressions, or unengaged service capabilities of the third-party application that are relevant to the authorized user based on the normalized user-state data structure.

For example, a negative state-completion signal corresponding to a particular composite state may indicate that the authorized user has not yet provided a specific category of information, completed a particular interaction flow, or engaged with a service capability offered by the third-party application. In response, the third-party application may proactively surface a graphical user interface element (e.g., a contextual popup window, recommendation panel, banner notification, or inline prompt) informing the authorized user that a related feature, service, or workflow is available and has not yet been used by the authorized user.

In some embodiments, in response to a third-party application receiving one or more positive state-completion signals via the bi-directional communication channel, the third-party application may automatically unlock, generate, or provision a system-generated credential for the authorized user. The system-generated credential may correspond to a capability, entitlement, status level, access right, or recognition artifact that was not previously available to the authorized user prior to receipt of the positive state-completion signals.

The one or more positive state-completion signals may indicate that a subset of state-dependent tasks associated with the third-party application satisfy pre-defined state-completion criteria, as encoded by binary state-bit values embedded at corresponding index positions of the completion-state classification vector. Upon detecting satisfaction of the pre-defined criteria, the third-party application may transition the authorized user into an updated credential state without requiring additional user input, manual verification, or reprocessing of the normalized user-state data structure.

In some embodiments, the system-generated credential may include, for example, a digital badge, certification marker, account level designation, access token, feature entitlement, usage threshold increase, or another machine-readable credential associated with the authorized user. The credential may be stored locally by the third-party application, remotely by the third-party computing service, or recorded in association with the authorized user within the completion-state propagation index.

Additionally, or alternatively, the third-party application may dynamically modify its user interface to reflect the unlocked credential. For example, the third-party application may render a previously unavailable interface control as active, display an updated account status indicator, expose additional workflow steps, or visually annotate the authorized user's profile to indicate successful completion of the associated composite state.

In some embodiments, credential unlocking may be reversible or conditional. For example, if a subsequent update to the completion-state classification vector indicates that one or more state-dependent tasks no longer satisfy the pre-defined state-completion criteria, the third-party application may revoke, suspend, or downgrade the system-generated credential, or mark the credential as inactive, while preserving an audit record of the prior credential state.

3.00 Computer-Implemented Method and Computer Program Product

It should be noted that a computer-program product may include a non-transitory machine-readable storage medium storing computer instructions that, when executed by one or more operations, may perform operations corresponding to the processes and sub-processes of method 200. Additionally, or alternatively, a computer-implemented method may include operations corresponding to processes and sub-processes of 200. Additionally, or alternatively, a computer-implemented system may include one or more processors, a memory, and a computer-readable medium operably coupled to the one or more processors, the computer-readable medium having computer-readable instructions stored thereon that, when executed by the one or more processors, cause a computing device to perform operations corresponding to the processes and sub-processes of method 200.

Embodiments of the system and/or method can include every combination and permutation of the various system components and the various method processes, wherein one or more instances of the method and/or processes described herein can be performed in real-time or near real-time, asynchronously (e.g., sequentially), concurrently (e.g., in parallel), or in any other suitable order by and/or using one or more instances of the systems, elements, and/or entities described herein.

It shall also be noted that the system and methods of the embodiments and variations described herein can be embodied and/or implemented at least in part as a machine comprising a computer-readable medium storing computer-readable instructions. The instructions may be executed by computer-executable components integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, memory sticks (e.g., SD cards, USB flash drives), cloud-based services (e.g., cloud storage), magnetic storage devices, Solid-State Drives (SSDs), or any suitable device. The computer-executable component is preferably a general or application-specific processor, but any suitable dedicated hardware or hardware/firmware combination device can alternatively or additionally execute the instructions.

Although omitted for conciseness, the preferred embodiments include every combination and permutation of the implementations of the systems and methods described herein. Furthermore, each method step, process step, or the like described herein may be performed in real-time or near real-time. It shall be noted that "real-time" or "near real-time" as generally used herein may refer to generating an output or performing an action within strict time constraints. For example, in one or more embodiments, real-time may be understood to be instantaneous, on the order of milliseconds, or on the order of minutes. Of course, depending on the particular temporal nature of the system in which an embodiment is implemented, other appropriate timescales may be considered acceptable for real-time or near real-time processing.

As a person skilled in the art will recognize from the previous detailed description and from the figures and claims, modifications and changes can be made to the embodiments of the disclosure without departing from the scope of the various described embodiments. For example, aspects/operations of system 100 and method 200 may be interchanged, substituted, and/or added between these methods.

It shall be noted that, in the method(s) described herein where one or more steps (e.g., processes) are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed. Additionally, or alternatively, the systems and methods described herein may include the systems and methods described in U.S. patent application Ser. Nos. 19/079,698, 19/259,230, and 19/067,102; each of which is incorporated herein by reference in its entirety for all purposes.

What is claimed is:

1. A computer-implemented system for classifying distributed user state data across a plurality of heterogeneous data sources, the computer-implemented system comprising:

a memory storing a plurality of computer-executable instructions and maintaining:

a normalized user-state data structure that comprises normalized, machine-readable user state data converted from a plurality of heterogeneous data sources;

a completion-state propagation index that associates one or more completion-state classification vectors with one or more service identifiers of one or more third-party computing services; and one or more processors that execute the plurality of computer-executable instructions to perform operations comprising:

receiving, from the plurality of heterogeneous data sources, encrypted user state data collected through a sequence of event-driven user interfaces, wherein the encrypted user state data includes encrypted user-entered responses and encrypted account data obtained from one or more linked external accounts;

decrypting, by the one or more processors executing a computer decryption program, the encrypted user state data into decrypted user state data and transforming the decrypted user state data into the normalized user-state data structure by:

extracting, by a feature extractor, a corpus of raw user state features from the decrypted user state data, converting, by the one or more processors, the corpus of raw user state features into normalized user state features associated with the normalized user-state data structure, and embedding the normalized user state features into the normalized user-state data structure;

generating, based on the normalized user-state data structure, a completion-state classification vector of the one or more completion-state classification vectors comprising a completion state classification value for a plurality of state-dependent tasks;

in response to generating the completion-state classification vector:

generating, by the one or more processors, one or more positive state-completion signals indicating that the completion state classification value for a subset of the plurality of state-dependent tasks satisfy predefined state-completion criteria;

generating, by the one or more processors, one or more negative state-completion signals indicating that the completion state classification value for a remainder of the plurality of state-dependent tasks do not satisfy the predefined state-completion criteria; and generating a real-time interactive visualization of the completion-state classification vector and the one or more positive and negative state-completion signals;

requesting, from an authorized user associated with the encrypted user state data, permission to display the real-time interactive visualization of the completion-state classification vector and the one or more positive and negative state-completion signals;

transmitting, via the one or more processors, the real-time interactive visualization to a device of the authorized user after the permission is granted; and automatically providing, via the one or more processors, the one or more third-party computing services with access to (i) the completion-state classification vector generated for the authorized user and (ii) the real-time interactive visualization of the completion-state classification vector, and (iii) the normalized user-state data structure in response to the authorized user subscribing to each of the one or more third-party computing services, wherein the completion-state propagation index is updated to store a machine-readable association between the completion-state classification vector of the authorized user and each of the one or more third-party computing services, wherein in response to the authorized user unsubscribing from a respective third-party computing service:

the one or more processors remove, from the completion-state propagation index, the machine-readable association between the completion-state classification vector of the authorized user and each of the one or more third-party computing services, thereby preventing subsequent access by the respective third-party computing service.

2. The computer-implemented system according to claim 1, wherein generating the completion state classification value for a first respective state-dependent task of the plurality of state-dependent tasks includes:

extracting, from the normalized user-state data structure, a first plurality of user state columns mapped to the first respective state-dependent task;

in response to extracting the first plurality of user state columns mapped to the first respective state-dependent task, generating a first binary state-bit value encoding that each of the first plurality of user state columns comprises a non-null value; and embedding, into the completion-state classification vector, the first binary state-bit value at a first index position of the completion-state classification vector corresponding to the first respective state-dependent task.

3. The computer-implemented system according to claim 2, wherein generating the completion state classification value for a second respective state-dependent task of the plurality of state-dependent tasks includes:

extracting, from the normalized user-state data structure, a second plurality of user state columns mapped to the second respective state-dependent task, different from the first plurality of user state columns;

in response to extracting the second plurality of user state columns mapped to the second respective state-dependent task, generating a second binary state-bit value encoding that at least one the second plurality of user state columns comprises a null value; and embedding, into the completion-state classification vector, the second binary state-bit value at a second index position of the completion-state classification vector corresponding to the second respective state-dependent task.

4. The computer-implemented system according to claim 1, wherein generating the one or more positive and negative state-completion signals and the real-time interactive visualization includes:

detecting, by the one or more processors, that a first index position of the completion-state classification vector includes a first binary state-bit value encoded to indicate that at least one of a first plurality of user state columns in the normalized user-state data structure comprise a null value;

in response to detecting the first index position of the completion-state classification vector, broadcasting, to a primary user interface controller node, a first real-time broadcast message comprising a first key-value payload comprising:

a first key-value pair comprising a state-dependent task key and a first respective state-dependent task corresponding to the first index position as a value of the state-dependent task key, and a second key-value pair comprising a completion state classification value key and the first binary state-bit value as a value of the completion state classification value key;

creating, in the real-time interactive visualization, a first visual task element based on the value of the completion state classification value key in the first real-time broadcast message; and setting, by the primary user interface controller node, the first visual task element to a first chromatic intensity based on the value of the state-dependent task key in the first real-time broadcast message.

5. The computer-implemented system according to claim 4, wherein the one or more processors that execute the plurality of computer-executable instructions perform the operations comprising:

generating, via the sequence of event-driven user interfaces, updated encrypted user state data for the first respective state-dependent task;

in response to generating the updated encrypted user state data for the first respective state-dependent task:

detecting, by the one or more processors, that the first index position of the completion-state classification vector has been updated from the first binary state-bit value to a second binary state-bit value encoded to indicate that each of the first plurality of user state columns in the normalized user-state data structure comprises a non-null value;

broadcasting, in response to detecting that the first index position has been updated to the second binary state-bit value, an update to the first real-time broadcast message that changes the value of the completion state classification value key from the first binary state-bit value to the second binary state-bit value; and dynamically changing, by the primary user interface controller node in real-time, the first visual task element from the first chromatic intensity to a second chromatic intensity in response to broadcasting the update to the first real-time broadcast message.

6. The computer-implemented system according to claim 4, wherein generating the one or more positive and negative state-completion signals and the real-time interactive visualization includes:

detecting, by the one or more processors, that a second index position of the completion-state classification vector includes a second binary state-bit value encoded to indicate that each of a second plurality of user state columns in the normalized user-state data structure comprise a non-null value;

in response to detecting the second index position of the completion-state classification vector, broadcasting, to the primary user interface controller node, a second real-time broadcast message comprising a second key-value payload comprising:

a third key-value pair comprising the state-dependent task key and a second respective state-dependent task corresponding to the second index position as the value of the state-dependent task key, and a fourth key-value pair comprising the completion state classification value key and the second binary state-bit value as the value of the completion state classification value key;

creating, in the real-time interactive visualization, a second visual task element based on the value of the completion state classification value key in the second real-time broadcast message; and setting, by the primary user interface controller node, the second visual task element to a second chromatic intensity based on the value of the state-dependent task key in the second real-time broadcast message.

7. The computer-implemented system according to claim 1, wherein requesting the permission to display the real-time interactive visualization and transmitting the real-time interactive visualization to the device of the authorized user includes:

transmitting, via the one or more processors, an electronic communication to the authorized user comprising:

a first graphical user interface button that grants the permission to display the real-time interactive visualization on the device of the authorized user, and a second graphical user interface button that denies the permission to display the real-time interactive visualization on the device of the authorized user;

automatically installing, on the device of the authorized user, an application bundle in response to receiving a selection of the first graphical user interface button; and automatically launching the application bundle and navigating to the real-time interactive visualization after automatically installing the application bundle on the device of the authorized user.

8. The computer-implemented system according to claim 7, wherein the one or more processors that execute the plurality of computer-executable instructions perform the operations comprising:

after automatically providing the one or more third-party computing services with access to (i) the completion-state classification vector generated for the authorized user, (ii) the real-time interactive visualization of the completion-state classification vector, and (iii) the normalized user-state data structure in response to the authorized user subscribing to each of the one or more third-party computing services:

detecting, by the application bundle, that a third-party application associated with the one or more third-party computing services is open at the device of the authorized user; and establishing a bi-directional communication channel between the third-party application and the one or more processors in response to detecting that the third-party application is open;

automatically transmitting, via the bi-directional communication channel, the one or more positive state-completion signals to the third-party application; and in response to the third-party application receiving the one or more positive state-completion signals, automatically inhibiting execution of an activated function of the third-party application corresponding to the subset of the plurality of state-dependent tasks that satisfy the pre-defined state-completion criteria.

9. The computer-implemented system according to claim 8, wherein the one or more processors that execute the plurality of computer-executable instructions perform the operations comprising:

after automatically providing the one or more third-party computing services with access to (i) the completion-state classification vector generated for the authorized user, (ii) the real-time interactive visualization of the completion-state classification vector, and (iii) the normalized user-state data structure in response to the authorized user subscribing to each of the one or more third-party computing services:

automatically transmitting, via the bi-directional communication channel, the one or more negative state-completion signals to the third-party application; and automatically surfacing, via a popup window of the third-party application, one or more unused or unavailable functions of the third-party application associated with each of the remainder of the plurality of state-dependent tasks that do not satisfy the pre-defined state-completion criteria.

10. The computer-implemented system according to claim 7, wherein the one or more processors that execute the plurality of computer-executable instructions perform the operations comprising:

after automatically providing the one or more third-party computing services with access to (i) the completion-state classification vector generated for the authorized user, (ii) the real-time interactive visualization of the completion-state classification vector, and (iii) the normalized user-state data structure in response to the authorized user subscribing to each of the one or more third-party computing services:

detecting, by the application bundle, that a third-party application associated with the one or more third-party computing services is open at the device of the authorized user; and establishing, via the one or more processors, a bi-directional communication channel between the third-party application and the one or more processors in response to detecting that the third-party application is open;

automatically transmitting, via the bi-directional communication channel, the one or more positive state-completion signals to the third-party application; and in response to the third-party application receiving the one or more positive state-completion signals, automatically providing, via the third-party application, a third-party system-generated credential that was not previously available to the authorized user before the one or more positive state-completion signals were transmitted.

11. The computer-implemented system according to claim 1, wherein converting the corpus of raw user state features into the normalized user state features includes:

extracting, via the one or more processors, the normalized user state features associated with the normalized user-state data structure;

constructing, via the one or more processors, a machine-readable classification prompt that specifies a normalization schema for mapping the corpus of raw user state features to the normalized user state features;

inputting, via the one or more processors, the machine-readable classification prompt to a large language model; and receiving, in response to the large language model executing the machine-readable classification prompt, a machine-readable output that maps each raw user state feature in the corpus of raw user state features to a respective normalized user state feature of the normalized user state features.

12. The computer-implemented system according to claim 11, wherein the normalization schema for mapping the corpus of raw user state features to the normalized user state features comprises:

a plurality of raw input feature identifiers corresponding to the corpus of raw user state features;

a plurality of normalized feature identifiers corresponding to the normalized user state features;

a required output structure defining a set of parameterized schema elements, each parameterized schema element of the set of parameterized schema elements comprising:

a respective normalized feature identifier corresponding to a distinct one of the plurality of normalized feature identifiers; and a placeholder parameter that prompts the large language model to replace text associated with the placeholder parameter with a raw input feature identifier corresponding to the respective normalized feature identifier.

13. The computer-implemented system according to claim 12, wherein the one or more processors that execute the plurality of computer-executable instructions perform the operations comprising:

detecting, by the one or more processors, that the text of the placeholder parameter has not been replaced with the raw input feature identifier; and inserting, in place of the placeholder parameter, a null identifier corresponding to the respective normalized feature identifier.

14. The computer-implemented system according to claim 1, wherein the one or more processors that execute the plurality of computer-executable instructions perform the operations comprising:

detecting, in real-time, a change in a completion state classification value at a corresponding index position of a respective completion-state classification vector of the one or more completion-state classification vectors stored in the completion-state propagation index; and propagating the change to each third-party computing service associated with the completion-state classification vector by transmitting only an index position identifier and an updated binary state-bit value, without regenerating the completion-state classification vector or reprocessing the normalized user-state data structure.

15. A computer-implemented method for classifying distributed user state data across a plurality of heterogeneous data sources, the computer-implemented method comprising:

receiving, from the plurality of heterogeneous data sources, encrypted user state data collected through a sequence of event-driven user interfaces, wherein the encrypted user state data includes encrypted user-entered responses and encrypted account data obtained from one or more linked external accounts;

decrypting, by the one or more processors executing a computer decryption program, the encrypted user state data into decrypted user state data and transforming the decrypted user state data into a normalized user-state data structure by:

extracting, by a feature extractors, a corpus of raw user state features from the decrypted user state data, converting, by the one or more processors, the corpus of raw user state features into normalized user state features associated with the normalized user-state data structure, and embedding the normalized user state features into the normalized user-state data structure;

generating, based on the normalized user-state data structure, a completion-state classification vector of the one or more completion-state classification vectors comprising a completion state classification value for a plurality of state-dependent tasks, wherein generating the completion state classification value for a first respective state-dependent task of the plurality of state-dependent tasks includes:

extracting, from the normalized user-state data structure, a first plurality of user state columns mapped to the first respective state-dependent task, in response to extracting the first plurality of user state columns mapped to the first respective state-dependent task, generating a first binary state-bit value encoding that each of the first plurality of user state columns comprises a non-null value, and embedding, into the completion-state classification vector, the first binary state-bit value at a first index position of the completion-state classification vector corresponding to the first respective state-dependent task;

in response to generating the completion-state classification vector:

generating, by the one or more processors, one or more positive state-completion signals indicating that the completion state classification value for a subset of the plurality of state-dependent tasks satisfy predefined state-completion criteria;

generating, by the one or more processors, one or more negative state-completion signals indicating that the completion state classification value for a remainder of the plurality of state-dependent tasks do not satisfy the predefined state-completion criteria; and generating a real-time interactive visualization of the completion-state classification vector and the one or more positive and negative state-completion signals;

requesting, from an authorized user associated with the encrypted user state data, permission to display the real-time interactive visualization of the completion-state classification vector and the one or more positive and negative state-completion signals;

transmitting, via the one or more processors, the real-time interactive visualization to a device of the authorized user after the permission is granted; and automatically providing, via the one or more processors, the one or more third-party computing services with access to (i) the completion-state classification vector generated for the authorized user and (ii) the real-time interactive visualization of the completion-state classification vector, and (iii) the normalized user-state data structure in response to the authorized user subscribing to each of the one or more third-party computing services, wherein a completion-state propagation index is updated to store a machine-readable association between the completion-state classification vector of the authorized user and each of the one or more third-party computing services.

16. The computer-implemented method according to claim 15, wherein generating the completion state classification value for a second respective state-dependent task of the plurality of state-dependent tasks includes:

extracting, from the normalized user-state data structure, a second plurality of user state columns mapped to the second respective state-dependent task, different from the first plurality of user state columns;

in response to extracting the second plurality of user state columns mapped to the second respective state-dependent task, generating a second binary state-bit value encoding that at least one the second plurality of user state columns comprises a null value; and embedding, into the completion-state classification vector, the second binary state-bit value at a second index position of the completion-state classification vector corresponding to the second respective state-dependent task.

* * * * *